United States Patent
Karimi et al.

(10) Patent No.: US 9,327,326 B2
(45) Date of Patent: May 3, 2016

(54) GEOPOLYMER ADDITIVES AND METHODS OF USE FOR TREATMENT OF FLUID FINE TAILINGS

(75) Inventors: Gholemhossein (Shahrad) Karimi, Calgary (CA); Darren MacDonald, Calgary (CA)

(73) Assignee: TOTAL E&P CANADA LTD., Calgary (CA)

( * ) Notice: Subject to any disclaimer, the term of this patent is extended or adjusted under 35 U.S.C. 154(b) by 680 days.

(21) Appl. No.: 13/554,079

(22) Filed: Jul. 20, 2012

(65) Prior Publication Data
US 2013/0019780 A1    Jan. 24, 2013

Related U.S. Application Data

(60) Provisional application No. 61/509,967, filed on Jul. 20, 2011.

(51) Int. Cl.
*C04B 12/00* (2006.01)
(Continued)
(Continued)

(52) U.S. Cl.
CPC ............... *B09B 3/00* (2013.01); *C02F 1/5209* (2013.01); *C04B 28/006* (2013.01);
(Continued)

(58) Field of Classification Search
CPC ...... C04B 18/08; C04B 28/02; C04B 18/141; C04B 28/04; C04B 18/101; C04B 18/162; C04B 28/00; C04B 12/005; C10G 2300/1033; C10G 2300/308; C10G 2300/4037; C10G 2300/4068; C10G 2300/4081; C10G 2300/80; C10G 2400/02; C10G 2400/04; C10G 31/09; C10G 33/08; C10G 45/00; C10G 45/02; C10G 45/58; C10G 47/00; C10G 53/02; C10G 9/007; C10G 9/24; B01D 2257/504; B01D 17/0208; B01D 17/12; B01D 19/00; B01D 19/0063; B01D 21/10; B01D 21/24; B01D 21/2494; B01D 21/34; B01D 53/62; B01D 15/02; B01D 2251/404; B01D 61/44; B01D 21/01; B01D 2251/402; B01D 53/18; B01D 53/78; B01D 21/00; B01D 21/262; B01D 21/32; B01D 2221/04; B01D 2252/20431; B01D 2252/20484; B01D 2252/20489; B01D 2252/602
USPC ................................................... 208/390, 400
See application file for complete search history.

(56) References Cited

U.S. PATENT DOCUMENTS

2012/0318170 A1* 12/2012 Moffett et al. ................ 106/270

FOREIGN PATENT DOCUMENTS

| CA | 2616707 | 2/2009 |
|---|---|---|
| CA | 2684155 | 4/2010 |

OTHER PUBLICATIONS

Bakhshi, Narendra N.; Gillies, Randal G.; Khare, Pradeep. "Treatment of Tar Sands Tailings with Fly Ash". Environmental Science and Technology. vol. 9. No. 4. pp. 363-364. 1975.*

(Continued)

*Primary Examiner* — Jun Li
*Assistant Examiner* — Karam Hijji
(74) *Attorney, Agent, or Firm* — Parlee McLaws LLP; Linda M. Thompson

(57) ABSTRACT

Select geopolymers are mixed, at high shear, with fluid fine tailings from an oil sand operation to increase the yield strength of deposits of the geopolymer-treated fluid fine tailings stream and to enhance the dewaterability of the deposits for meeting the regulated, minimum undrained shear strength of 5 kilopascals (kPa) in the fluid fine tailings deposited in the previous year.

17 Claims, 22 Drawing Sheets

(51) Int. Cl.
  *C09B 3/00* (2006.01)
  *C02F 1/52* (2006.01)
  *B09B 3/00* (2006.01)
  *C04B 28/00* (2006.01)
  *C02F 103/10* (2006.01)

(52) U.S. Cl.
  CPC .......... *C02F 2103/10* (2013.01); *C04B 12/005* (2013.01); *Y02P 40/165* (2015.11); *Y02W 30/92* (2015.05); *Y02W 30/93* (2015.05); *Y02W 30/94* (2015.05); *Y02W 30/95* (2015.05)

(56) References Cited

OTHER PUBLICATIONS

Fly Ash—Coal Combustion Residue by Dr. Kamar Shah Ariffin for a course in Industrial Minerals (EBS 425/3) taught at the University of Malaysia; http://mineral.eng.usm.my/web%20halaman%20mineral/Components%20of%20coal%20ash.pdf.

"Strengthening of Solidified Dilute Tailings Slurry"; Zou et al; Journal of Geotechnical and Geoenvironmental Engineering; Jan. 1999; pp. 11-15.

"Treatment of Tar Sands Tailings with Fly Ash"; Bakhshi et al; Environmental Science & Technology; vol. 9, No. 4, Apr. 1975.

* cited by examiner

GEOPOLYMER ADDITIVES AND METHODS OF USE FOR TREATMENT OF FLUID FINE TAILINGS

CROSS-REFERENCE TO RELATED APPLICATIONS

This application claims the benefit of U.S. Provisional Patent application Ser. No. 61/509,967 filed Jul. 20, 2011, the entirety of which is incorporated herein by reference.

FIELD

Embodiments disclosed herein relate to the treatment of fluid fine tailings produced as a result of oil sands operations and, more particularly, to the use of geopolymer additives for creating trafficable deposits therefrom, such as in accordance with regulatory guidelines.

BACKGROUND

Oil sands in the Athabasca region of northern Alberta constitute one of the largest hydrocarbon deposits in the world, containing about 173 billion barrels (bbls) of recoverable bitumen. Approximately 20% of this volume is surface mineable.

Mined oil sand is trucked to an ore preparation plant (OPP) where mined oil sand is crushed and further comminuted with the addition of hot water. If warranted, chemicals to enhance bitumen recovery are added to generate a slurry, which is then pipelined to an extraction plant.

The slurry is received and processed in the extraction plant, typically through a series of settling and flotation vessels where bitumen-rich froth is extracted from the bulk of the water and the solids in the slurry. The water, coarse solids and fine solids discharged from the extraction plant form large volumes of liquid tailings, typically comprising the fine solids having a diameter less than about 44 microns, and solid tailings, typically comprising the coarse solids having a diameter greater than about 44 microns. The bitumen-rich froth is further processed in a froth treatment plant to produce a final bitumen product and a smaller, froth treatment tailings stream comprising primarily fine solids and water.

The large volumes of coarse and fine solids and process water initially form a tailings slurry which is transported to tailings impoundment facilities. Oil sand mine operators are required to safely contain all solids derived from the tailings slurry and ultimately reclaim all disturbed land to a productive state. Operators are further required to retain any remaining fluid tailings throughout the life of a mine and, at the end-of-mine life, permanently store any residual fluid.

When the tailings slurry streams are impounded during normal operations, such as in one or more tailings ponds, coarser solids separate from the water in the slurry to form beaches above and below the water surface. Some of the fine solids in the slurry are captured in the sand beaches. The remainder of the fine solids typically report to the tailings ponds, suspended throughout the water column therein. In a steady-state operation, the concentration of the suspended solids achieves a vertical distribution ranging in the tailings ponds from about 0.5 wt % at the surface to about 30 wt % at the bottom of the pond. The fines in suspension at the bottom of the pond are called mature fine tailings (MFT). Historically, MFT have been found to consolidate at inconsequential rates relative to the lifetime of a mine, resulting in large inventory accumulations during mine operation.

The accumulation of MFT as a result of conventional tailings management operations has significant consequences:

(i) tailings storage volumes must be continually increased to accommodate the increasing MFT volumes;

(ii) significant quantities of water are retained in the MFT, resulting in an equivalent demand on fresh water intake or make-up to sustain the operation; and (iii) provision for perpetual containment of the MFT in a safe, environmentally-acceptable manner, at the end of the mining operation.

As a consequence, the Energy Resources Conservation Board (ERCB) of Alberta, Canada, issued Directive 074, "Tailings Performance Criteria and Requirements for Oil Sands Mining Schemes" in 2009. The directive establishes stringent criteria for the reduction of fluid tailings and the formation of trafficable deposits, and stipulates a comprehensive protocol for reporting the performance of fine tailings deposits. In summary, Directive 074 requires that 50% of the fines in the processed oil sand ore feed be captured immediately in designated disposal areas (DDAs). Further, the fines deposited in the DDAs must achieve a minimum undrained shear strength of 5 kilopascals (kPa) in the materials deposited in the previous year and be ready for reclamation within 5 years after active deposition has ceased by ensuring that a trafficable surface layer of the deposit has a minimum undrained shear strength of 10 kPa.

Others have attempted to reduce the accumulation of MFT inventory. In the early 1990s, a collaboration by Suncor Energy Inc. (Calgary, Alberta, Canada), Syncrude Canada Ltd. (Fort McMurray, Alberta, Canada) and the University of Alberta (Edmonton, Alberta, Canada) established the basis for a new approach to control the accumulation of MFT. The approach involves creating a blend of coarse sand tailings, fines, water and a coagulating agent, typically gypsum, in which resulting coagulated fines are purported to have sufficient strength to prevent the sand from separating from the mixture. The mixture is called composite or consolidated tailings (CT) or non-segregating tailings (NST). The weight of the sand dispersed within the CT was thought to be sufficient to accelerate the dewatering of the fines in the CT. It has been purported that a competent surface amenable to reclamation can be attained using CT in less than a decade. Successful implementation of CT has not been straightforward. Significant development work has been done primarily by Suncor and Syncrude.

For operations having sizeable inventories of "legacy" MFT in tailings ponds, CT operations have not resulted in a reduction of MFT inventory, as new MFT continues to be produced at rates greater than that which can be used in CT production. Notwithstanding the apparent advance achieved with the discovery and implementation of CT, tailings storage volumes at the operating plants have continued to exceed approved containment volumes.

Other additives such as flocculants or carbon dioxide have been noted in the prior art to try to entrap the fines to release some of the water. Applicant believes that the use of these additives has been marginally successful to release water, but may not be sufficient to achieve Directive 074 targets without additional efforts such as thin lift drying, the use of additional mechanical equipment such as centrifuges, cyclones, thickeners, in-line treatment or additional chemical treatment.

The use of mechanical equipment treatment, as detailed above, with various discharge methods have been noted in prior art. While the use of mechanical equipment enhances the release of water from the fines prior to deposition, its use may not provide an economically attractive solution.

Canadian patent application 2,684,155 to EI DuPont de Nemours describes the use of a polysilicate microgel (PSM) to enhance (i) bitumen recovery, particularly from poor quality oil sands, and (ii) dewatering of fine tailings. The use of combinations of other chemical additives (polyacrylamides, preferably anionic, low molecular weight cationic polymers, multivalent metal compounds, silicates, NaOH, and sodium citrate) is also considered. The use of PSM results in more rapid filtration and higher solids concentration in the cake (up to 55% mineral). PSM addition is in the range 25-5000 g/t oil sand.

Canadian Patent Application 2,616,707 to Remedial Construction Services LLP describes the use of an ash composition for treating a wide range of sludges or solid materials having undesirably high moisture contents for forming a treated sludge capable of supporting the weight of commercial construction equipment. The suggested thickness of the final treated material is about 5 feet. The ash compositions suitable for embodiments described in Canadian Patent Application 2,616,707 comprise ash high in alumina, sulfate, calcium, ash formed during flue gas desulfurization, gypsum, or any other ash or mixtures of ash that include ingredients sufficient to form a calcium aluminum sulfate matrix or mixtures or combinations thereof. One of skill would understand that the ash described are mainly derived from the underflow of a combustion unit, being high in metal oxide sulfate and low in silica. The matrix takes up a varying amount of water, being 10 to 50 moles of water per mole of matrix mineral depending on pH. A hydrated calcium aluminum sulphate hydroxide (ettringite) matrix appears to be preferred. The described sludge reclamation requires relatively high dosage rates, being in the order of about 1 wt % to about 50 wt % of the entirety of the sludge being treated.

Applicant believes that many geopolymer additives used in construction and other industries are typically cement or are mixtures which comprise a large amount of cement with a smaller amount of fly ash. As such, these geopolymer additives are useful in treating sludges which comprise greater than about 40 wt % dry solid content and for forming high strength materials, such as having yield strengths in the megapascal range.

Typically, mature fine tailings from an oil sand operation comprise about 25-35 wt % dry solids content. Thickened fine tailings, generally the result of an in-line treatment of an underflow from a thickener, typically comprise from about 40 wt % to about 60 wt % dry solids content.

As taught in a paper titled FLY ASH—COAL COMBUSTION RESIDUE by Dr. Kamar Shah Ariffin for a course in Industrial Minerals (EBS 425/3) taught at the University of Malaysia, the entirety of which is incorporated herein by reference, fly ash is the finely divided mineral residue resulting from the combustion of ground or powdered coal in electric generating plants (ASTM C 618). The pertinent portions of the paper are largely reproduced herein as follows:

"Fly ash consists of inorganic matter present in the coal that has been fused during combustion of the coal. The particles solidify while suspended in the exhaust gases and are generally spherical in shape. The fly ash is collected in electrostatic precipitators and has a silt size of about 0.074 to about 0.005 mm.

Fly ash is a pozzolanic material and has been classified into two classes, F and C, depending upon the chemical composition of the fly ash. According to ASTM C 618, the chemical requirements to classify any fly ash are shown in the following Table A.

TABLE A

| Properties | Fly Ash Class | |
|---|---|---|
| | Class F | Class C |
| Silicon dioxide ($SiO_2$), plus aluminum oxide ($Al_2O_3$) plus iron oxide ($Fe_2O_3$), Min. % | 70.0 | 50.0 |
| Sulfur trioxide ($SO_3$), Max % | 5.0 | 5.0 |
| Moisture Content, Max % | 3.0 | 3.0 |
| Loss on ignition, Max % | 6.0* | 6.0 |

*The use of class F fly ash containing up to 12% loss of ignition may be approved by the user if acceptable performance results are available.

Class F fly ash is produced from burning anthracite and bituminous coals. The fly ash has siliceous or siliceous and aluminous material, which itself possesses little or no cementitious value but will, in finely divided form and in the presence of moisture, chemically react with calcium hydroxide at ordinary temperature to form cementitious compounds (Chu et al, 1993)

Class C fly ash is produced normally from lignite and sub-bituminous coals and usually contains significant amounts of calcium hydroxide (CaO) or lime (Cockrell et al., 1970). Class C fly ash, in addition to having pozzolanic properties, also has some cementitious properties (ASTM C 618-99).

Chemical constituents of fly ash mainly depend on the chemical composition of the coal. However, fly ash that are produced from the same source and which have very similar chemical composition, can have significantly different ash mineralogies depending upon the coal combustion technology use. The different ash mineralogies cause the hydration properties and leaching characteristics to vary between generating facilities.

The amount of crystalline material versus glassy phase material depends upon the processes used in a particular power plant. The relative proportion of each, the size distribution, the chemical nature of the glassy phase, the type of crystalline material and the nature and percentage of unburned carbon are factors which can affect the hydration and leaching properties of the fly ash.

Formation of cementitious material by the reaction of free lime (CaO) with the pozzolans ($AlO_3$, $SIO_2$, $Fe_2O_3$) in the presence of water is known as hydration. The hydrated calcium silicate gel or calcium aluminate gel (cementitious material) can bind inert material together. For Class C fly ash, the calcium oxide reacts with the pozzolans in the fly ash itself. In the case of Class F fly ash, lime must be added for the hydration reaction to occur. The pozzolanic reactions are as follows:

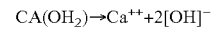

$$CA(OH_2) \rightarrow Ca^{++} + 2[OH]^-$$

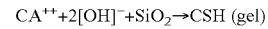

$$CA^{++} + 2[OH]^- + SiO_2 \rightarrow CSH \text{ (gel)}$$

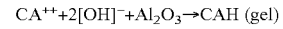

$$CA^{++} + 2[OH]^- + Al_2O_3 \rightarrow CAH \text{ (gel)}$$

Hydration of tricalcium aluminate in the ash provides one of the primary cementitious products in many ashes. The rapid rate at which hydration of the tricalcium aluminate occurs results in the rapid set of these materials and is the reason why delays in compaction result in lower strengths of the stabilized materials. The hydration chemistry of fly ash is very complex and stabilization must be based on physical properties of the treated soil and cannot be predicted by the chemical composition of the fly ash.

The total metals content of the fly ash depends on the composition of the coal. The potential for leaching the metals depends on the total metals content and the crystallinity of the fly ash. Metals in the glasseous phase are expected to leach at much lower rates than metals in the crystalline phase. For stabilized soil the leachability of metals not only depends on the property of the fly ash but also on the soil used. Some part of the metals leached from the fly ash will be absorbed on the clay minerals in the soil."

There is interest in the industry in finding a relatively low cost solution to the problems related to the accumulation and deposition of fluid fine tailings and which can be applied to fluid fine tailings regardless the manner in which they have been produced in an oil sand operation.

SUMMARY

A method of treating and disposing of fluid fine tailings from an oil sand operation utilizes suitable geopolymers which are mixed with the fluid fine tailings, including mature fine tailings (MFT) and thickened tailings (TT) and having shear imparted thereto. The resulting deposit meets the regulated, minimum undrained shear strength of 5 kilopascals (kPa) in the materials deposited in the previous year. The deposits are thereafter ready for reclamation within 5 years after active deposition has ceased by ensuring that a trafficable surface layer of the deposit has a minimum, undrained shear strength of 10 kPa.

Embodiments disclosed herein are accomplished in an in-line mixing process, the geopolymer-treated tailings stream being deposited in thin or thick lifts at a dedicated disposal site and being exposed thereat to ambient conditions, including natural drying and one or more freeze-thaw cycles. Embodiments are thus accomplished without the need for post-deposition manipulation, such as harrowing using tractors according to conventional procedures.

In a broad aspect of the invention, a method for forming an oil sand fine tailings deposit having a minimum undrained shear strength of 5 kilopascals at about one year following depositing, comprises flowing a stream of fluid fine tailings having a solid content of about 25 wt % to about 55 wt % and adding and mixing a dry geopolymer to the stream of fluid fine tailings. The geopolymer is added at a lower limit of from about 0.2 wt % to about 3 wt % of the dry solids content of the fluid fine tailings stream or greater, for forming a geopolymer-treated tailings stream. Shear is imparted to the geopolymer-treated tailings stream during the adding and mixing step. The geopolymer-treated tailings stream is deposited for forming the deposit, the deposit being exposed to ambient weather conditions. The dry geopolymer is selected from the group comprising Class C flyash, activated Class F flyash, cement kiln dust (CKD), activated Landfill cement kiln dust (LCKD), activated colloidal silica, microwave incinerated rice husk ash, ground granulated blast furnace sludge and mixtures thereof.

In another broad aspect, a system for practicing the method of forming the deposit, wherein the dry geopolymer is added to the flowing stream of fluid fine tailings, comprises one or more high shear, in-line mixers for mixing the dry geopolymer material with the stream of fluid fine tailings for imparting the shear thereto.

In yet another broad aspect, a geopolymer-treated fluid fine tailings mixture, adapted for depositing and forming a deposit having a minimum undrained shear strength of 5 kilopascals one year following depositing, comprises a stream of fluid fine tailings having a solid content of about 25 wt % to about 55 wt % and an effective amount of a dry geopolymer selected from the group comprising Class C flyash, activated Class F flyash, cement kiln dust (CKD), activated Landfill cement kiln dust (LCKD), activated colloidal silica, microwave incinerated rice husk ash, ground granulated blast furnace sludge and combinations thereof. Shear is imparted to the mixture during addition of the geopolymer to the stream of fluid fine tailings.

The effective amount of the dry geopolymer has a lower limit of from about 0.2 wt % to about 3 wt % of the dry solids content of the fluid fine tailings stream.

DETAILED DESCRIPTION

Figure 1:
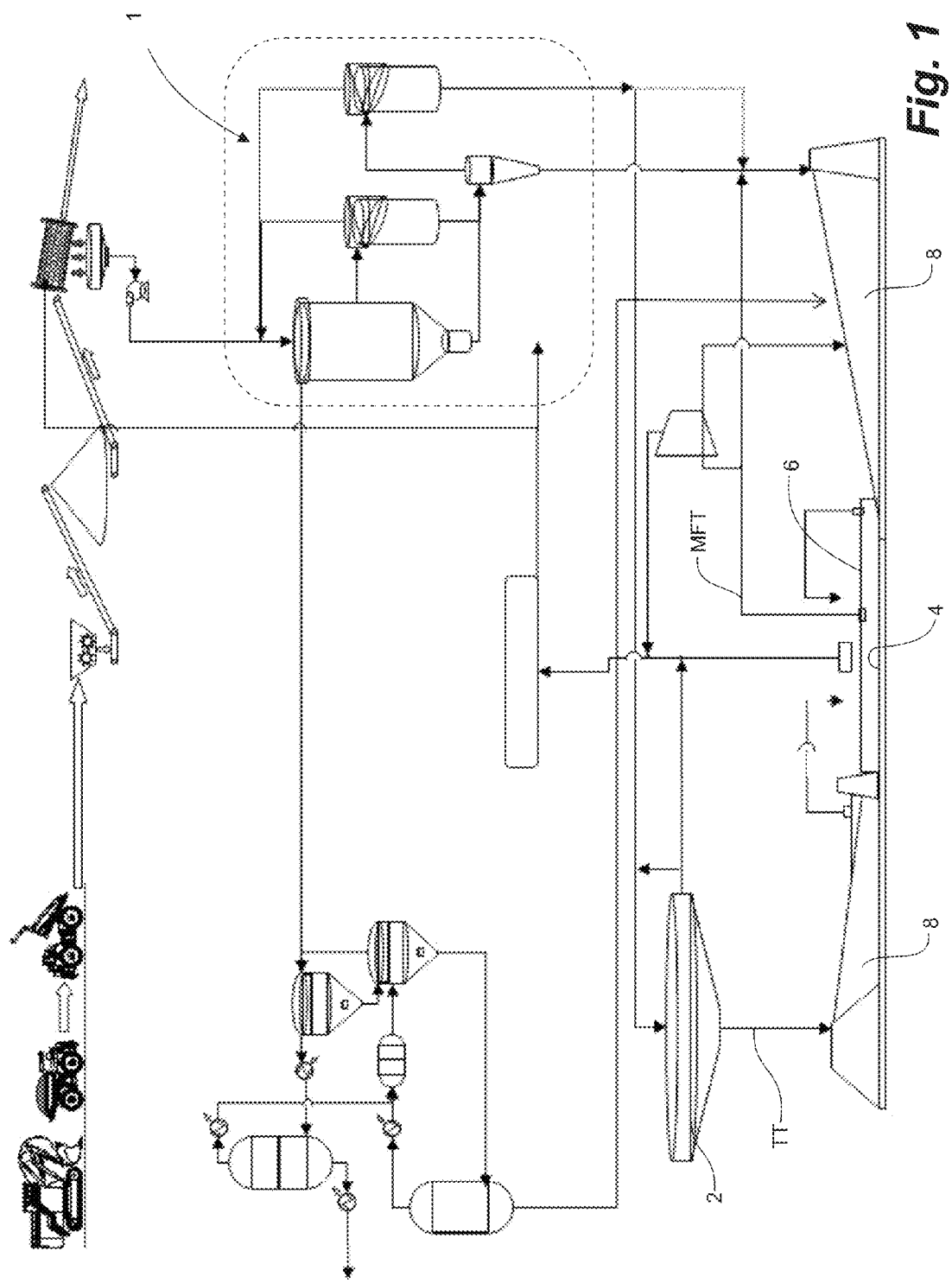
FIG. 1 is a fanciful representation of an oil sand operation illustrating production of thickened tailings from a froth production operations as an underflow from a thickener and mature fine tailings in a tailings pond.

Embodiments of the disclosure provide a low cost, chemical treatment method, using geopolymers G, for large volumes of fluid fine tailings streams to generate marginal or low strength deposits, as compared to products in the construction industry and the like. The marginal or low strength deposits are however sufficient to meet reclamation objectives, such as outlined in Directive 074.

Applicant believes that geopolymer additives G most suitable for embodiments disclosed herein for use in oil sands fluid fine tailings disposal are cementitious materials which generally form a hydrated calcium silicate gel or a calcium aluminate gel when mixed with the fluid fine tailings. Applicant believes that the geopolymers G enhance strength of the fluid-like deposit material due to hydration properties as well as leaching characteristics.

Aluminum or silica-based structures in the geopolymers G react with water in the fluid fine tailings, absorbing the water and forming the gels. The gels formed can bind inert material together for strengthening deposits of the fluid fine tailings. Further, metals leached from the geopolymers G are adsorbed on the clay minerals of the fluid fine tailings and such ionic interactions cause the clay particles to move closer together, further aiding the strengthening process.

Applicant believes that the geopolymers G suitable for embodiments disclosed herein comprise fly ash, being either Class C flyash or activated raw flyash (RFA), also known as Class F flyash; cement being typically Portland cement; cement kiln dust (CKD); activated Landfill CKD (LCKD); microwave incinerated rice husk ash (MIRHA); ground granulated blast furnace sludge (GGBS); activated colloidal silica; and mixtures thereof. Applicant believes that MIRHA and GGBS are not commercially available in any quantity at this time.

Landfill CKD (LCKD), raw flyash (RFA) and colloidal silica are not self-activating and require activation by the addition of and effective amount of lime or other suitable activator A, including another of the geopolymers G, to initiate the strengthening reaction. Applicant has postulated that the suitable activator A provides at least a source of calcium ions to the reaction.

Applicant believes that treatment of fluid fine tailings (FFT), according to embodiments, will reliably meet Directive 074 targets and can do so in shorter period of time compared to other available technologies. Embodiments can be used to enhance the strength of both mature fine tailings (MFT) and thickened tailings (TT). By using geopolymers which are typically waste products, embodiments not only provide a low cost disposal method but also provide an environmental benefit. Overall, embodiments provide a more economically feasible treatment compared to available mechanical treatments.

In embodiments, the amount of geopolymer G to be added is dependent upon the dry solids content of the fluid fine tailings stream FFT. While there appears to be no upper limit to the amount of geopolymer G that can be added, other than economic, a lower limit or effective amount to achieve the minimum undrained shear strength of 5 kilopascals (kPa) in the first year may be as low as about 2 wt % to about 3 wt % of the dry solids content or less. More particularly, Applicant believes, based on extrapolation from testing data at about 1 wt %, the lower limit for achieving the target 5 kPa is about 0.2 wt % of the dry solids content in the fluid fine tailings.

As one of skill in the art will appreciate, the timing to reach the 5 kPa may be different depending upon the initial solids content of the fluid fine tailings stream FFT and the geopolymer G or combination of geopolymers G used. Applicant believes that the 5 kPa is typically achieved when a geopolymer-treated fluid fine tailings GT stream is deposited and the deposit is dewatered to at least about 50 wt % solids or greater. In the case of MFT, Applicant believes that the target 5 kPa is reached when the deposit is dewatered to about 50-55 wt % solids content. In the case of TT, Applicant believes that the target 5 kPa is reached after the deposit is dewatered to about 75 wt % solids content.

As shown in FIG. 1, the fluid fine tailings FFT are typically froth production tailings generated as a result of froth production operations 1 in an oil sand operation. The FFT are thickened tailings (TT) which are an underflow from a thickener 2 and typically have a solids content of about 40-55 wt %, and Mature Fine Tailings (MFT) which are removed from adjacent a bottom 4 of a tailings pond 6 and have a solids content of from about 25 wt % to about 35 wt % and more particularly from about 30 wt % to about 35 wt %. As one of skill will appreciate, solids in the MFT are typically 100 wt % fine tailings while solids in the TT are typically only about 30 wt % fines. The TT and MFT are ultimately deposited in dedicated disposal or deposition areas 8.

Figure 2:
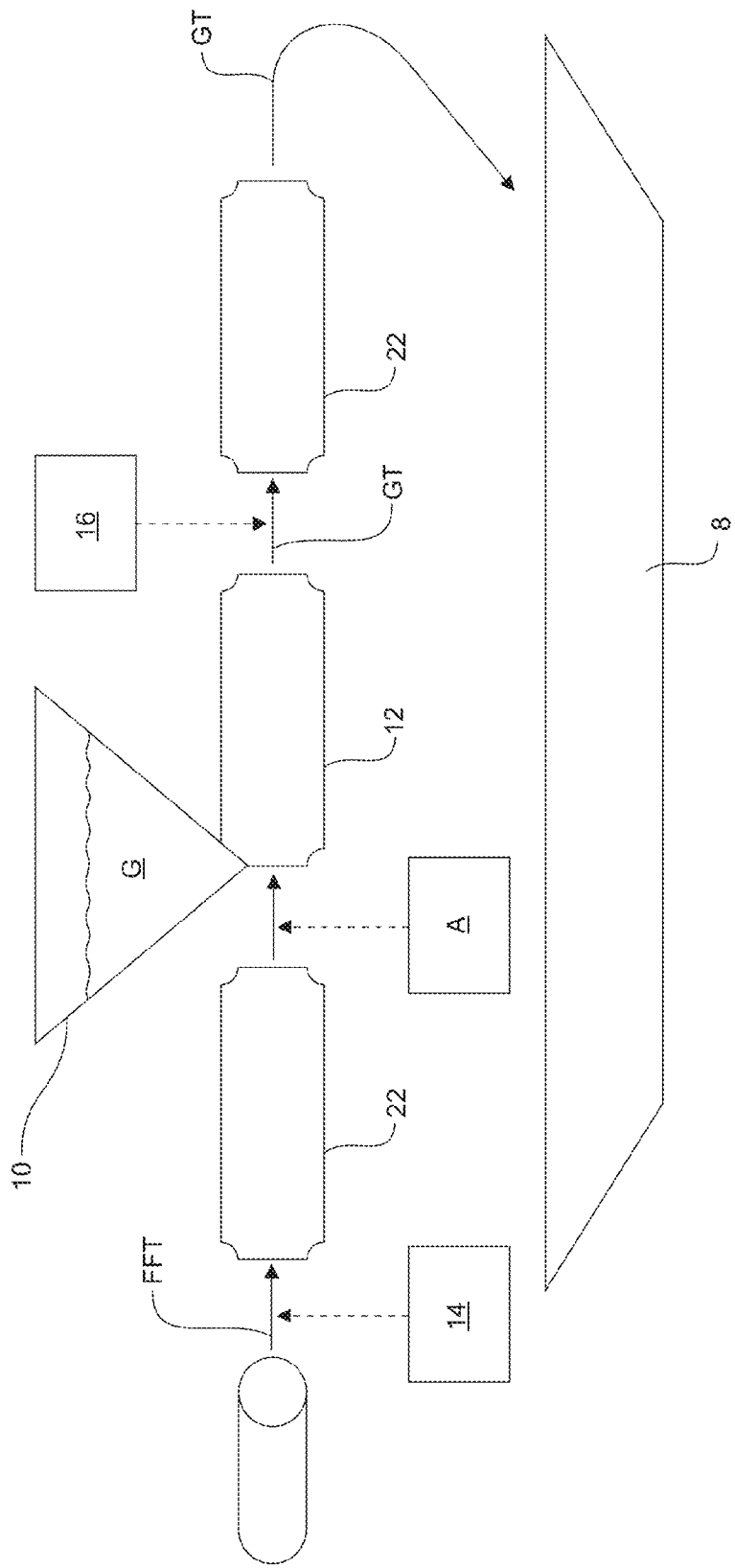
FIG. 2 illustrates an in-line addition, mixing and deposition process for the use of geopolymers in reclamation of oil sand fluid fine tailings, according to embodiments of the disclosure.

In an embodiment, as shown in FIG. 2, a suitable geopolymer G is added to the fluid fine tailings stream FFT in an in-line mixing process. The geopolymers G are substantially dry materials which are supplied from a hopper 10 to the fluid fine tailings stream FFT, flowing through one or more high-shear, inline mixers 12, such as a jet mixer. The geopolymer G and the fluid fine tailings stream FFT are mixed therein for forming a geopolymer-treated tailings stream GT and shear is applied thereto. Applicant believes that the shear uniformly distributes the geopolymer G within the fluid fine tailings FFT and further imparts energy to the geopolymer-treated fluid fine tailings stream GT which aids in settling of the solids therefrom when deposited. Applicant believes that a suitable high-shear, in-line mixer 12 is capable of providing an optimum pressure drop of about 45-55 psi across the mixer unit.

Thus, unlike many of the processes used in other industries, the geopolymer additives G are added to the fluid fine tailings stream FFT and mixed prior to discharge at the dedicated discharge or deposition area 8. Once deposited, the geopolymer-treated tailings GT, exposed to ambient weather conditions, including natural drying and one or more freeze/thaw cycles, dewater and increase strength gradually at the dedicated deposition area 8. In embodiments, the deposited geopolymer-treated tailings GT require little, if any, manipulation by mechanical means, such as harrowing using tractors and the like, as is common in conventional oil sand tailings deposition operations.

Figure 3:
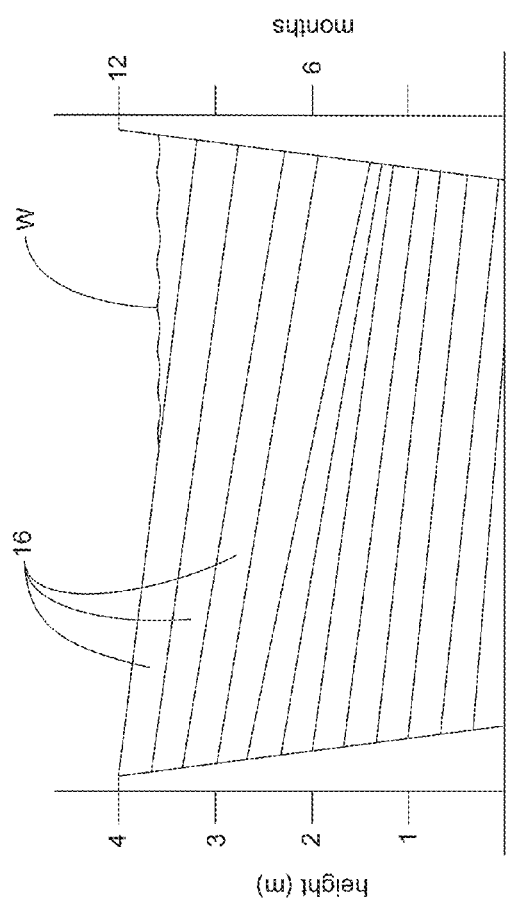
FIG. 3 is a diagrammatic representation of a deposit comprising a plurality of thin lifts of geopolymer-treated fluid fine tailings deposited over time.
Figure 4:
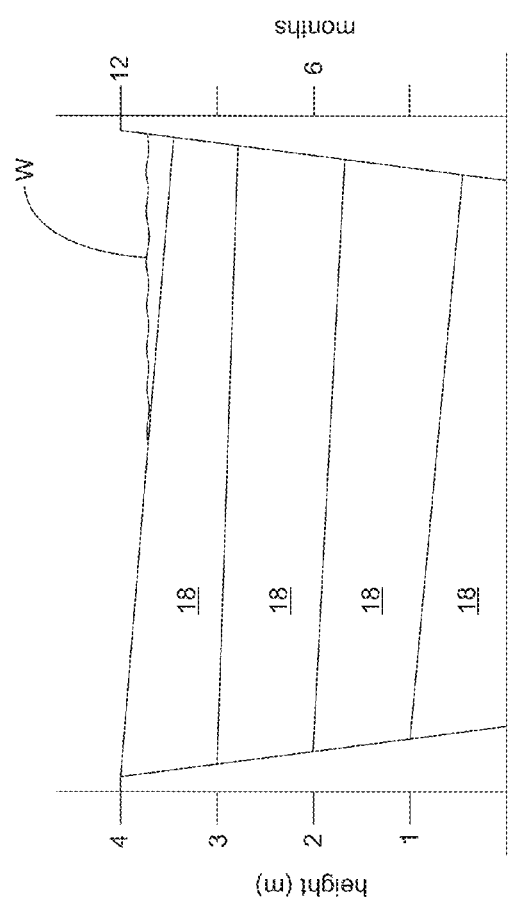
FIG. 4 is a diagrammatic representation of a deposit comprising a plurality of thick lifts of geopolymer-treated fluid fine tailings deposited over time.
Figure 5:
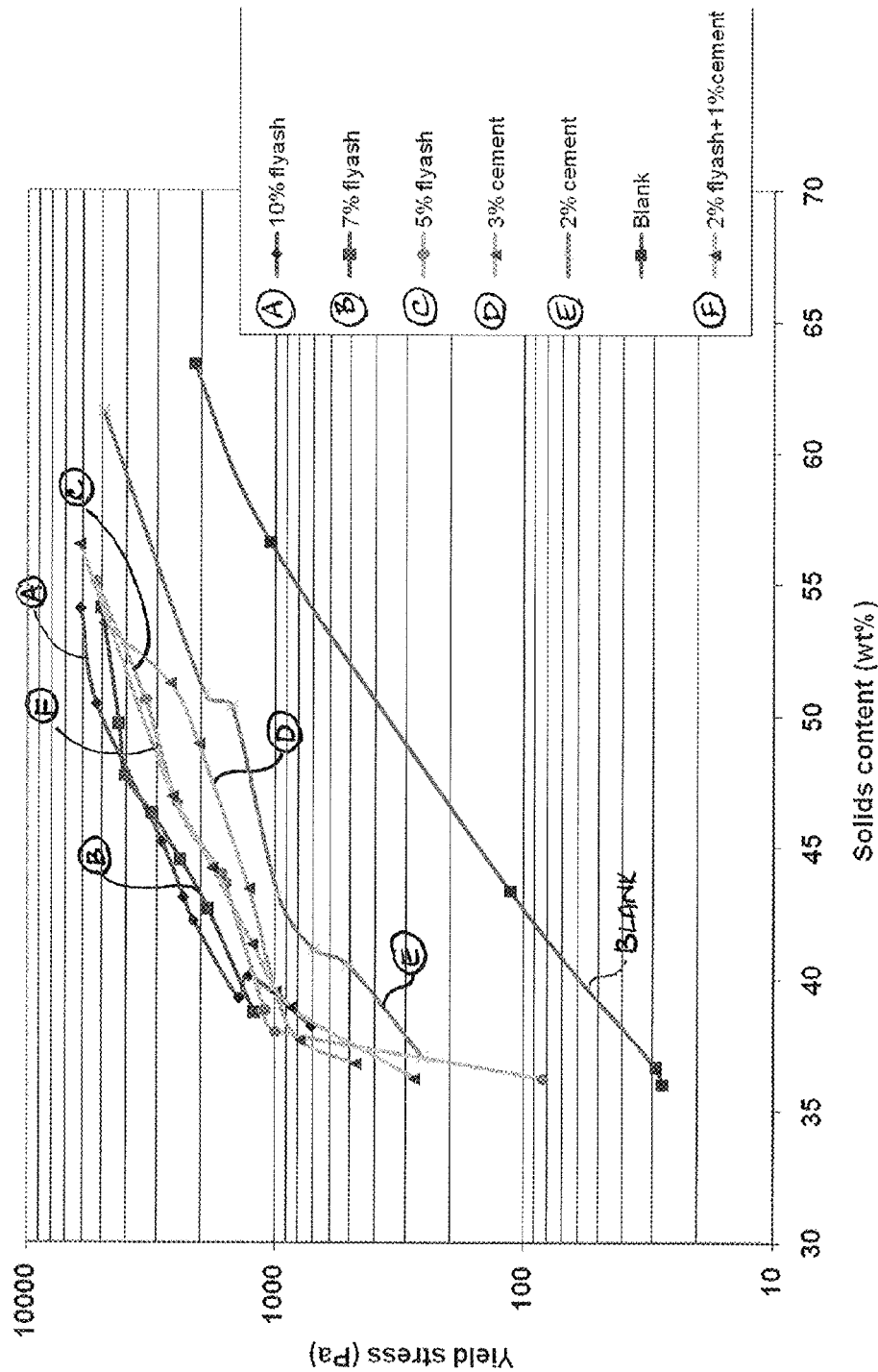
FIG. 5 is a graphical representation of the yield stress relative to solids content of mature fine tailings treated with various amounts of fly ash or cement or mixtures thereof, and deposited in an open lid container.
Figure 6:
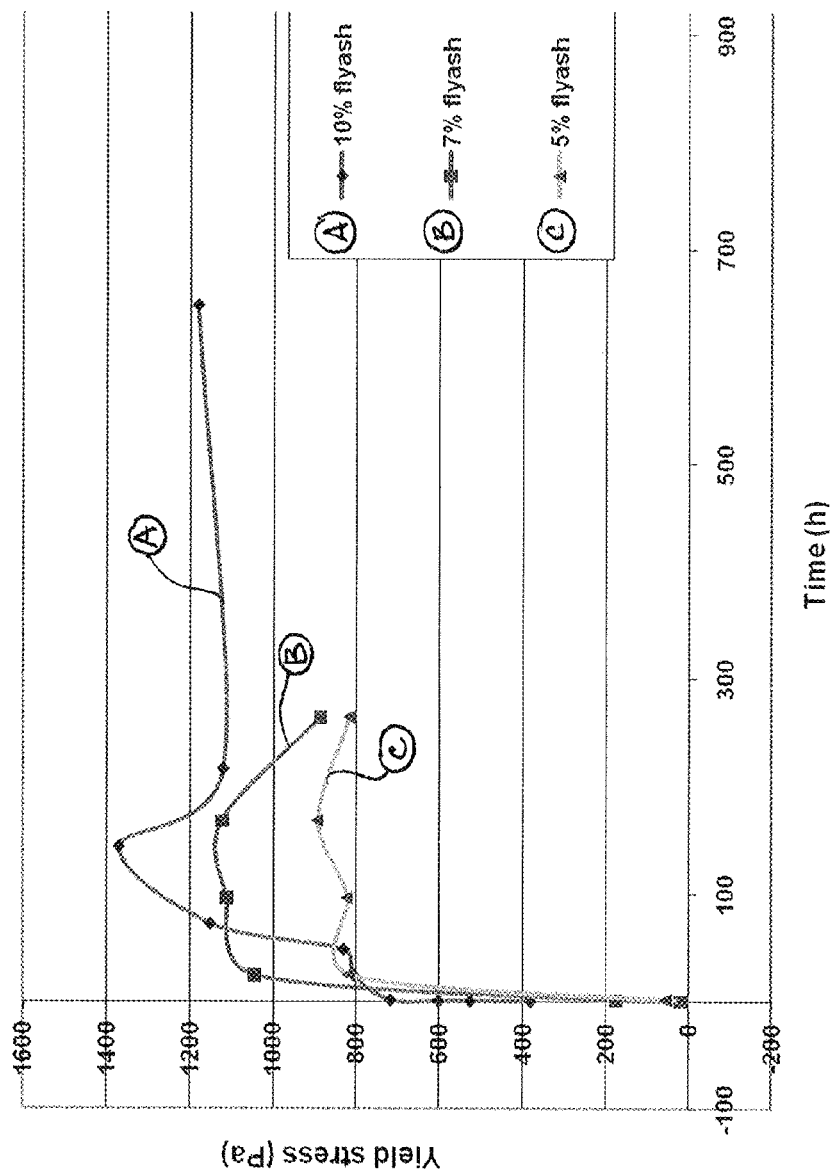
FIG. 6 is a graphical representation of the yield stress relative to time of mature fine tailings, treated with various amounts of fly ash and deposited in a closed lid container.
Figure 7:
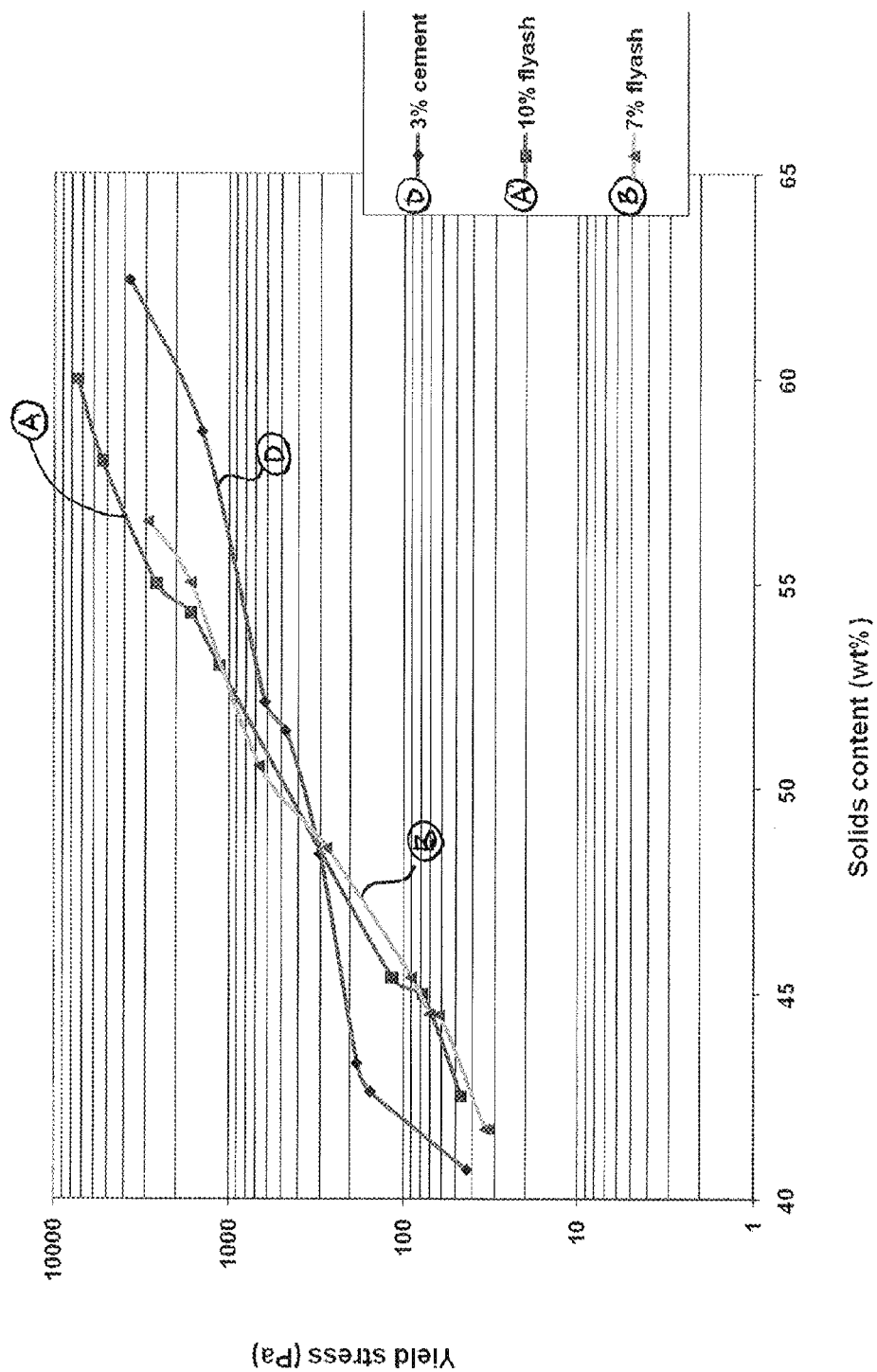
FIG. 7 is a graphical representation of the yield stress relative to solids content of thickened tailings, having a sand to fines ratio of 0.8 and 40 wt % solids content, treated with various amounts of fly ash or cement and deposited in an open lid container.
Figure 8:
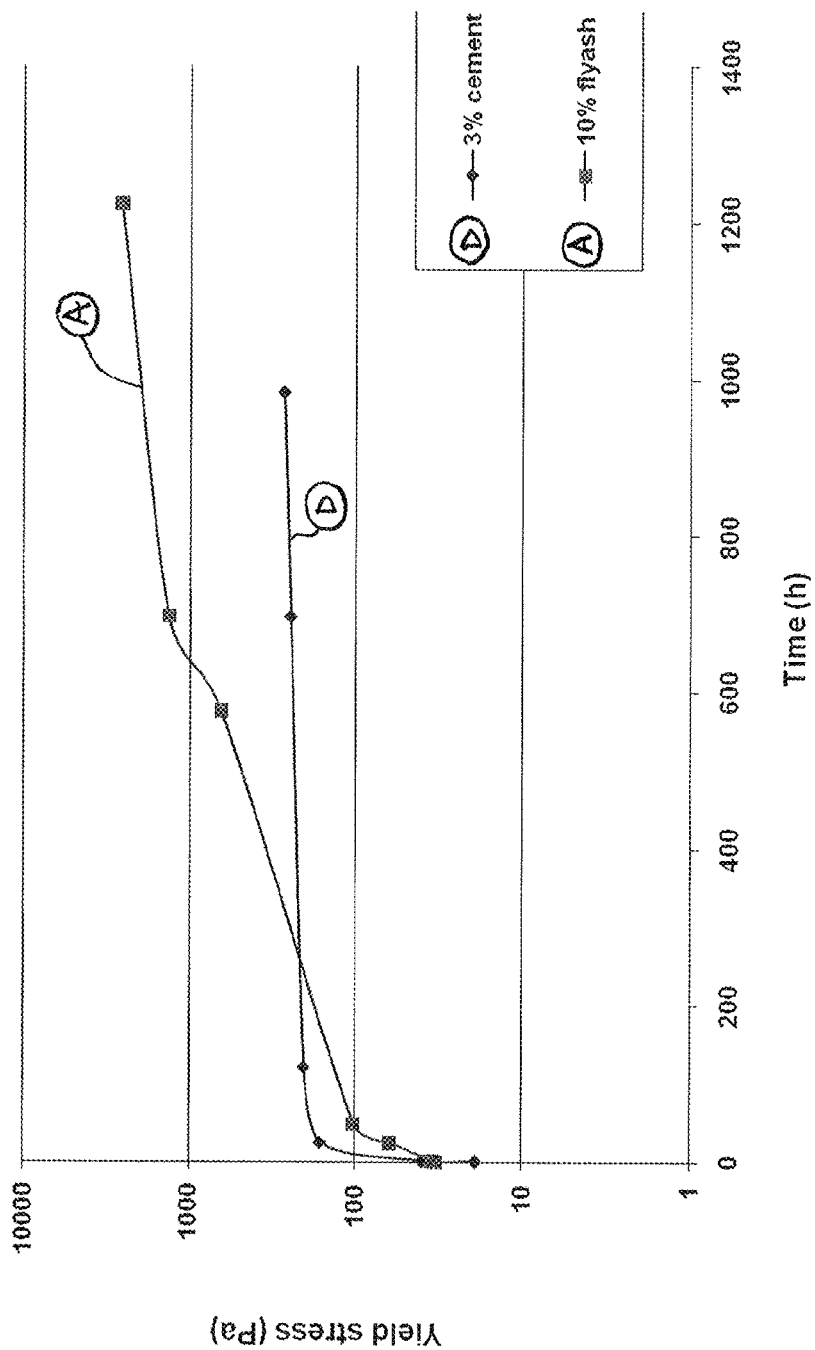
FIG. 8 is a graphical representation of the yield stress relative to time of thickened tailings, having a sand to fines ratio of 0.8 and 40 wt % solids content, treated with various amounts of fly ash or cement and deposited in a closed lid container.
Figure 9:
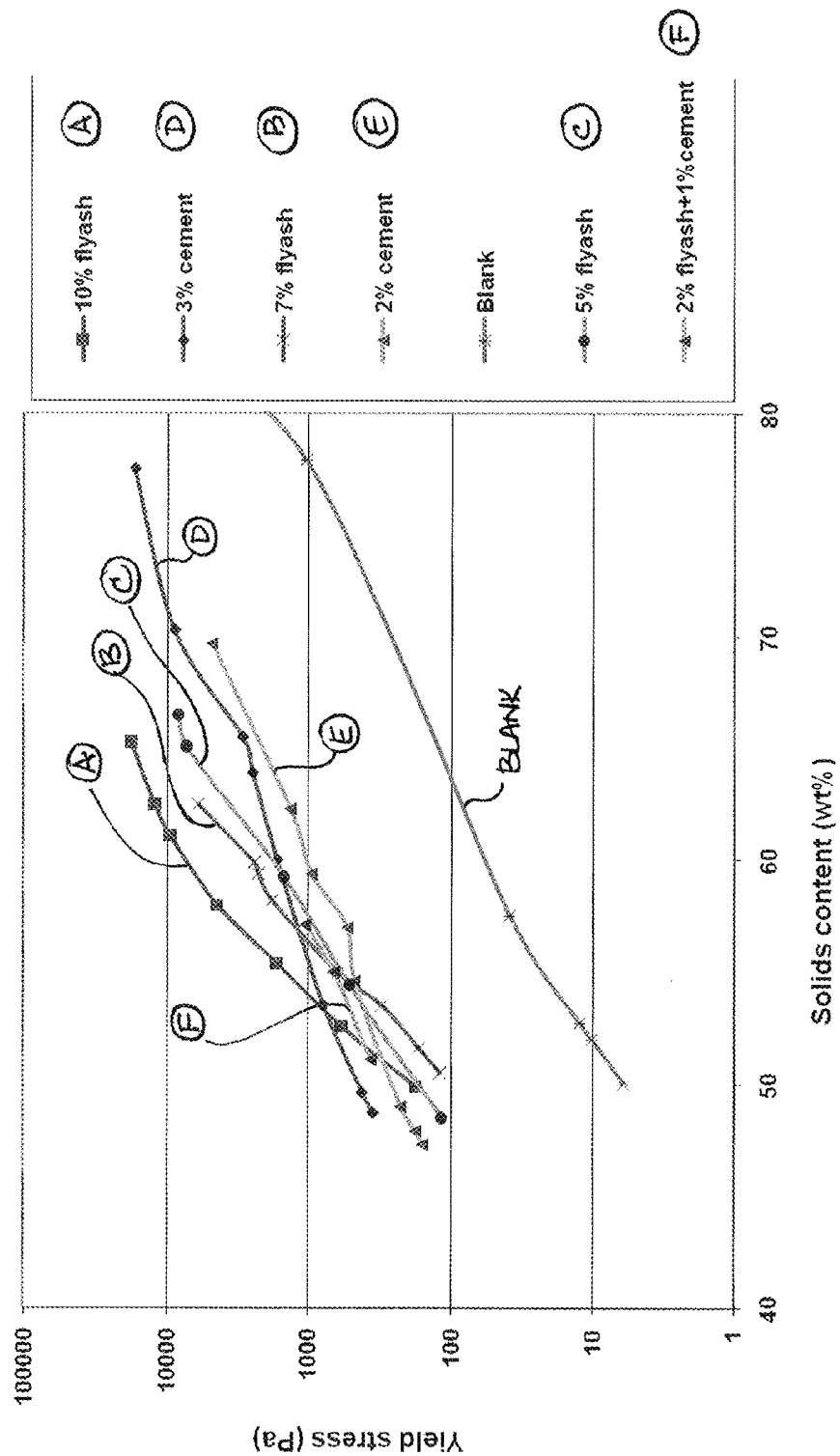
FIG. 9 is a graphical representation of the yield stress relative to solids content of thickened tailings, having a sand to fines ratio of 0.8 and 45 wt % solids content, treated with various amounts of fly ash or cement or mixtures thereof and deposited in an open lid container.
Figure 10:
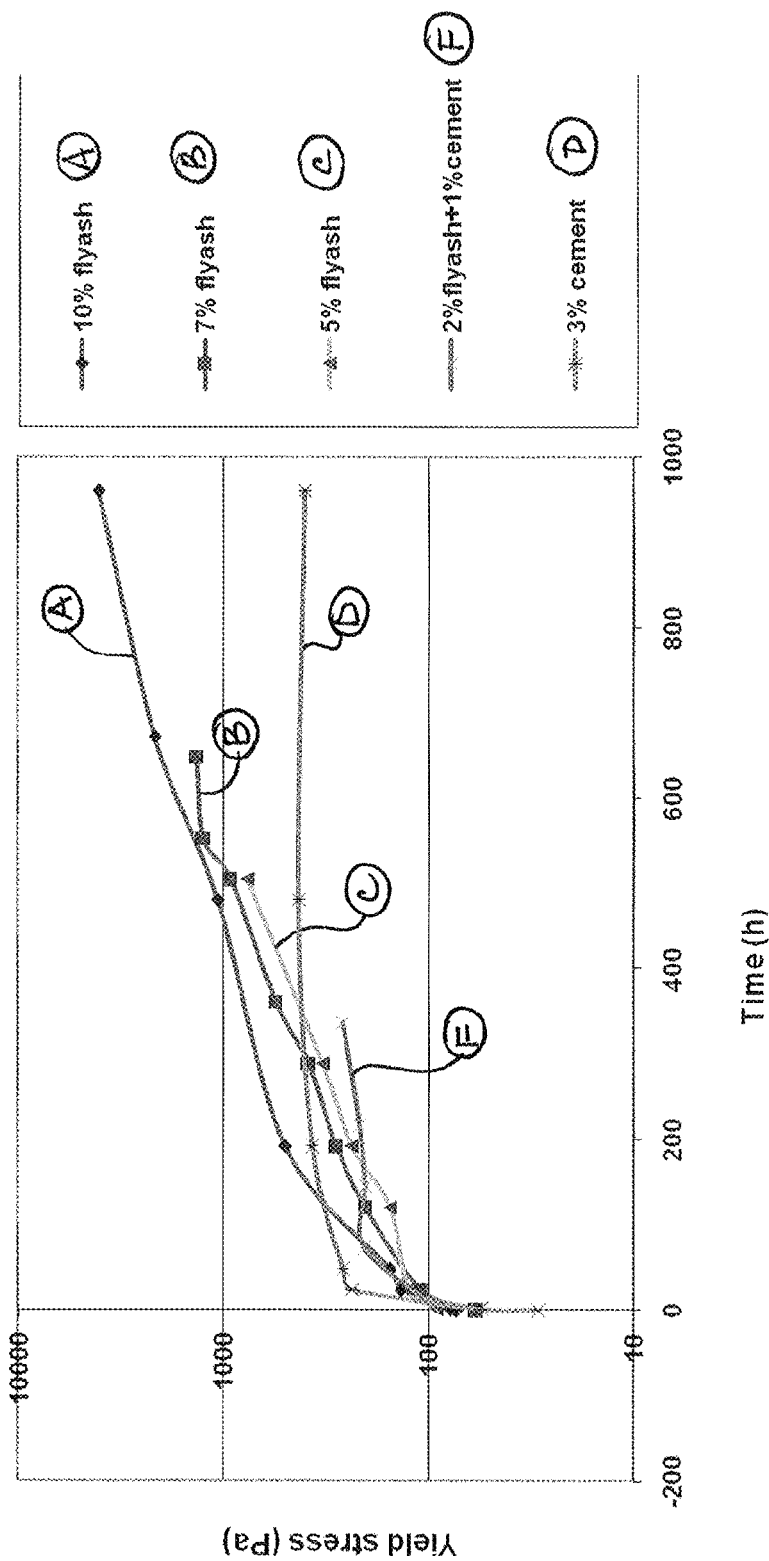
FIG. 10 is a graphical representation of the yield stress relative to time of thickened tailings, having a sand to fines ratio of 0.8 and 45 wt % solids content, treated with various amounts of fly ash or cement or mixtures thereof and deposited in a closed lid container.
Figure 11:
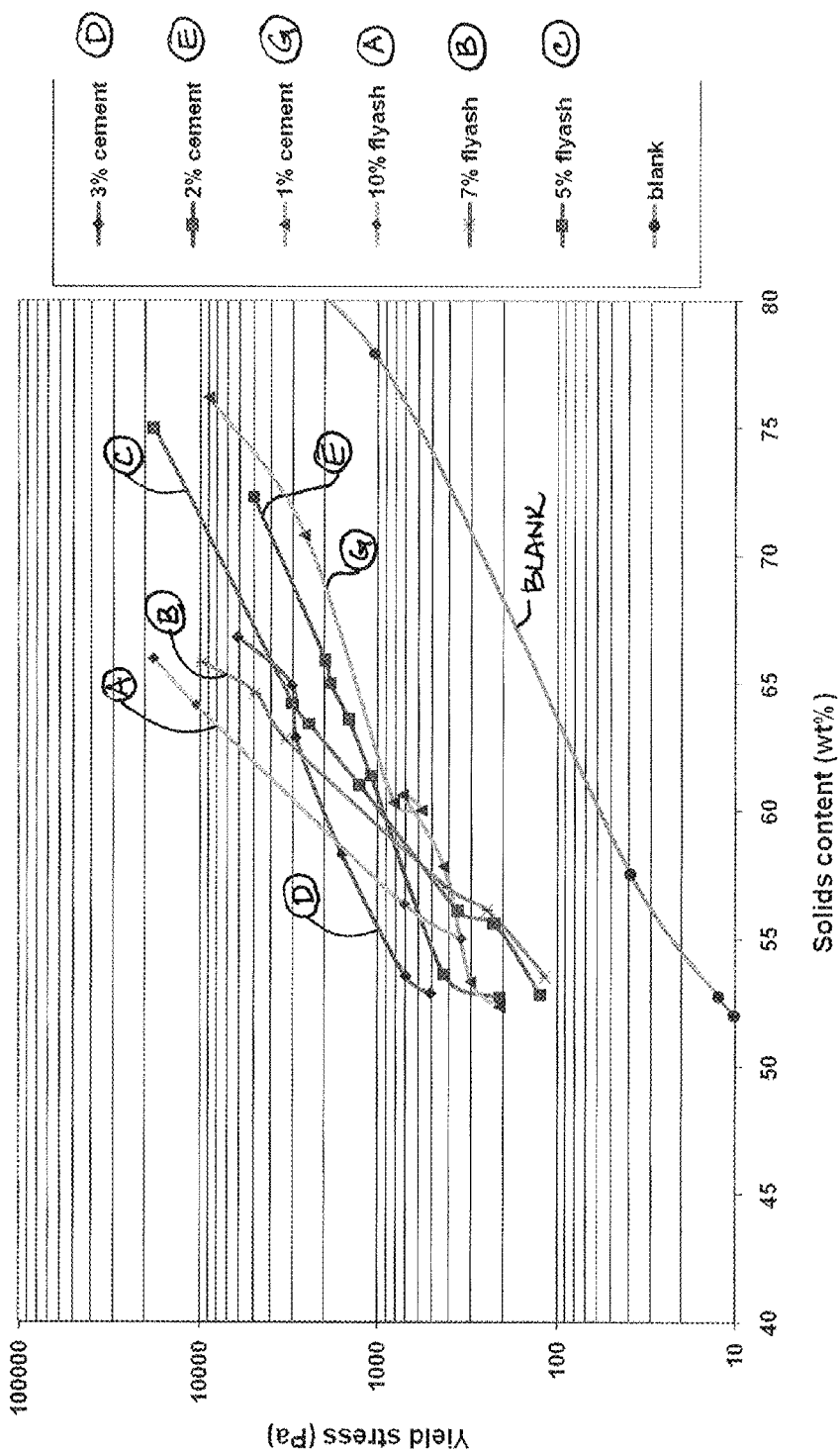
FIG. 11 is a graphical representation of the yield stress relative to solids content of thickened tailings, having a sand to fines ratio of 0.8 and 50 wt % solids content, treated with various amounts of fly ash or cement and deposited in an open lid container.
Figure 12:
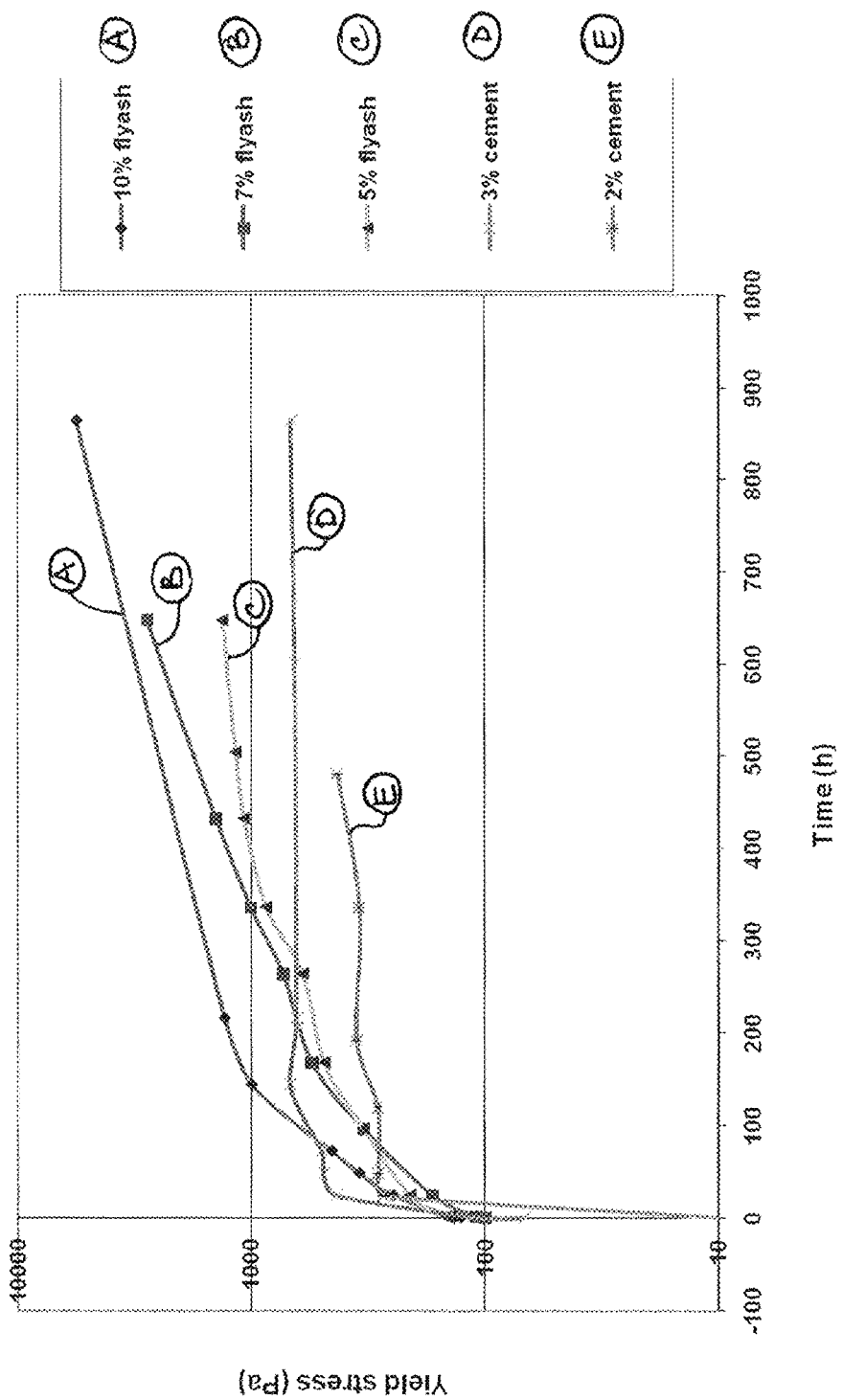
FIG. 12 is a graphical representation of the yield stress relative to time of thickened tailings, having a sand to fines ratio of 0.8 and 50 wt % solids content, treated with various amounts of fly ash or cement and deposited in a closed lid container.

In embodiments, as shown schematically in FIGS. 3 and 4, the geopolymer-treated tailings streams GT are deposited in the dedicated disposal area 14 in either a plurality of thin lifts 16 or in a plurality of thick lifts 18. Typically, each of the plurality of thin lifts 16 are exposed to at least natural drying to remove water therefrom and gain strength. Each of the plurality of thick lifts 18 are typically exposed to at least one freeze/thaw cycle to aid in dewatering. A time interval between each lift of the plurality of thin or thick lifts 16,18 is between one to two weeks depending on the weather conditions and rate of yield strength increase during the first week of disposal as is understood in the art.

As shown in FIG. 3, in the case where the plurality of thin lifts 16 are used, each thin lift 16 is about 25 cm±about 10 cm resulting in a deposit 20 of up to about 3.5 m±about 0.5 m total height per year. As is understood in the art, a deposition angle is controlled to ensure the angle is not too shallow or too steep, to avoid problems which may otherwise occur.

As shown in FIG. 4, in the case where the plurality of thick lifts 18 are used, each thick lift 18 is about 1 m thick, resulting in a deposit of up to about 4 m±about 1 m total height per year. As with the plurality of thin lifts 16 of FIG. 3, the deposition angle is also controlled.

Having reference again to FIG. 2, optionally during the in-line process, the pH of the fluid fine tailings stream FFT can be altered before or after the addition of the geopolymer G to optimize the chemistry of water W which is released during dewatering of the strengthening deposit 20. Thus, the resulting water W is at an acceptable or desired pH when released from the deposit 20.

In an embodiment, where the pH of the fluid fine tailings stream FFT is adjusted prior to the addition of the geopolymer G, a pH adjuster 14, typically a reducer, is added to the fluid fine tailings stream FFT and mixed therewith by one or more upstream, conventional in-line mixers 22, prior to the addition of the geopolymer G from the hopper 10.

Further, should the resulting pH of the geopolymer treated tailings GT, after the addition and mixing of the geopolymer G, still be higher or lower than desired, a pH neutralizer 16 can be added to the geopolymer-treated tailings stream GT downstream from the one or more high shear, in-line mixers 12 and mixed therewith in one or more additional downstream, conventional in-line mixers 22 before deposition at the dedicated disposal area 14 for controlling the quality of the water W released from the geopolymer-treated fluid fine tailings stream GT as it dewaters.

In embodiments, wherein a geopolymer G is used which requires activation, the effective amount of the activator A, such as lime, is added to the fluid fine tailings stream FFT after pH adjustment, if required, and prior to the addition of the geopolymer G.

Further, in embodiments, retarders or rheology modifiers 24, such as $K_2HPO_4$, can be added to the geopolymer-treated fluid fine tailings GT stream during the in-line mixing, as required. The addition of such rheology modifiers 24 postpones the reaction the strengthening reaction between the geopolymer G and the fluid fine tailings FFT to enhance dewatering, reduce initial yield strength, and minimize rheology and pumping issues. After a period of time following depositing, during which water W is released from the deposit 20, the effect of the rheology modifier 24 ceases and the strengthening reaction begins. As one of skill in the art will appreciate, the solids content in the geopolymer-treated tailings stream GT effectively remains in a range which can be pumped for depositing before the strengthening reaction begins however, the FFT can be treated at a dosage rate suitable for about 60 wt % solids which is achieved by the dewatering of the deposit prior to the reaction with the geopolymer G commencing.

In embodiments, the rheology modifier 24 is added in a range of about 100 ppm to about 500 ppm depending upon the fluid fine tailings stream FFT conditions and the type of geopolymer G used as is understood by those of skill in the art. Rheology modifiers are known in the concrete industry to delay the pozzolanic reaction resulting in setting of the concrete for up to hours in order to permit flow of the concrete during placement.

Examples

Studies have been performed to investigate the effectiveness of adding an amount of a geopolymer additive, in amounts which are relatively small compared to amounts currently used in other industries, to enhance the strength of a fluid fine tailings FFT deposit and water drainage therefrom, according to embodiment disclosed herein.

In initial testing, the average yield strengths of a first lift after two weeks of disposal was measured at about 5 kPa. An expected, average yield strength for the total height (i.e. 3 m) of the deposit after one of year in the dedicated disposal area, including exposure to natural drying and freeze/thaw cycles, is estimated to be about 10 kPa, with a minimum of greater than 5 kPa at any location within the deposit.

Initial Testing

Samples of mature fine tailings (MFT) were obtained from tailings ponds at Syncrude's oil sand operations. The MFT contained 34.5% solids content and had a particle size distribution (PSD) indicating 100% fines, being less than about 44 microns, and 60% clay.

Samples of thickened tailings (TT) were obtained from a 2009 Saskatchewan Research Council's (SRC) pilot thickener project. The samples were adjusted to contain different solids content by removing different amounts of water from the TT, the water having separated therefrom on standing.

Processed fly ash was obtained from Recon Construction Services Inc. of York, Pa., USA. The fly ash was characterized as Class C fly ash which had a moisture content of 0.08 wt % and a particle size distribution (PSD) analysis indicating a sand to fines ratio (SFR) of 0.94.

Powdered cement, such as Portland cement containing substantially no sand and no rocks and a PSD analysis indicating an SFR of 0.03 was also used.

Having reference to FIGS. 5 to 12, Applicant has noted that a higher yield stress was obtained using fly ash compared to that obtained using cement. When the lid of a container in which a portion of the treated tailings were deposited was closed, representing no evaporation of water, the strength of the deposit was observed to exceed 5.6 kPa after 36 days. When the lid of a container in which a portion of the treated tailings were deposited was left open, representing evaporation of water such as with natural drying in ambient weather conditions, the strength of the deposit was observed to exceed 20 kPa after only 9 days.

Using cement alone also improved the strength of the tailings significantly, however, the highest yield stress achieved in a closed lid test (FIG. 9) was less than 1.0 kPa after 36 days.

Applicant observed with the lower dosages of fly ash used, the treated MFT passed the minimum 5 kPa requirement in the open lid tests, indicating that a smaller fraction of fly ash, such as 3-4 wt %, be considered.

Promising results were also observed using a mixture of fly ash and cement. In the case where a mixture of 2 wt % fly ash and 1 wt % cement were used, the performance was better than when 5 wt % fly ash or 3 wt % cement were used alone.

Figure 13:
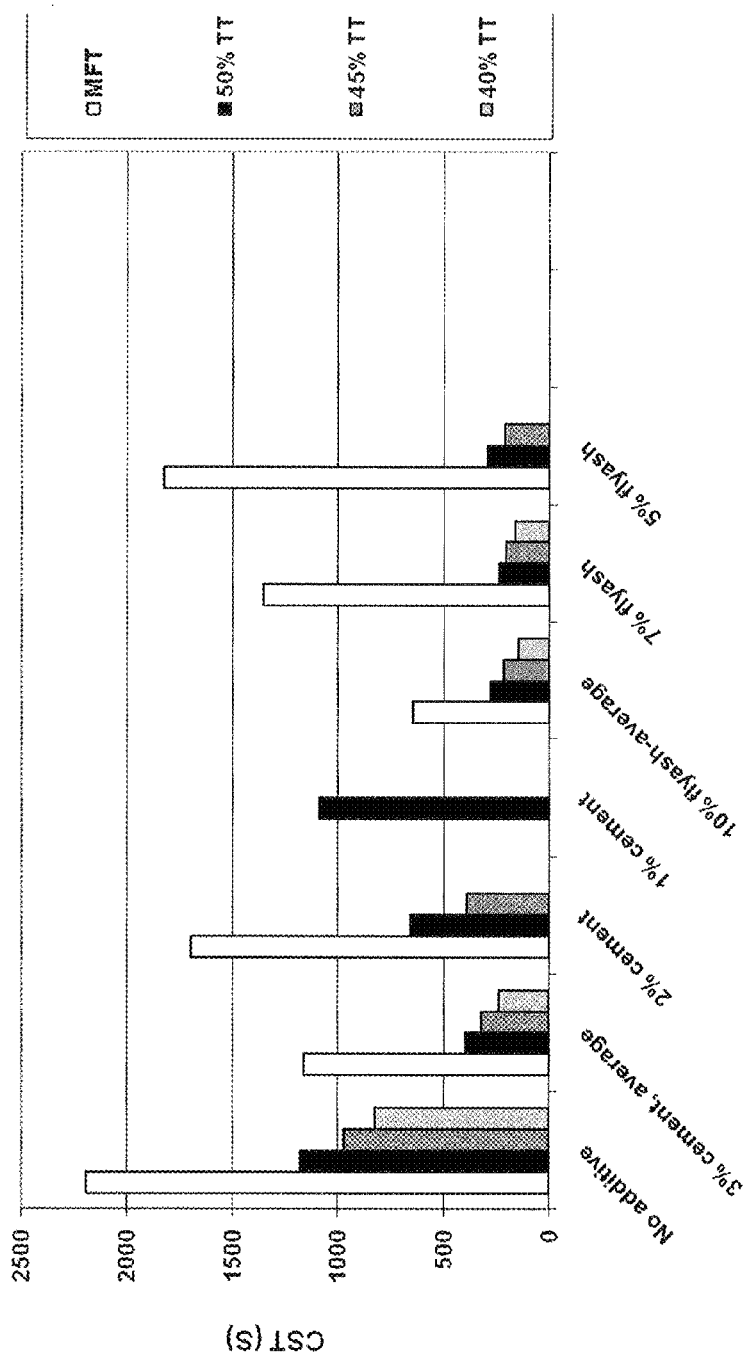
FIG. 13 is a graphical representation of the results of capillary suction testing, comparing the ease with which the water portion can be separated from the solids portion in mature fine tailings and thickened tailings having different solids content therein.
Figure 14:
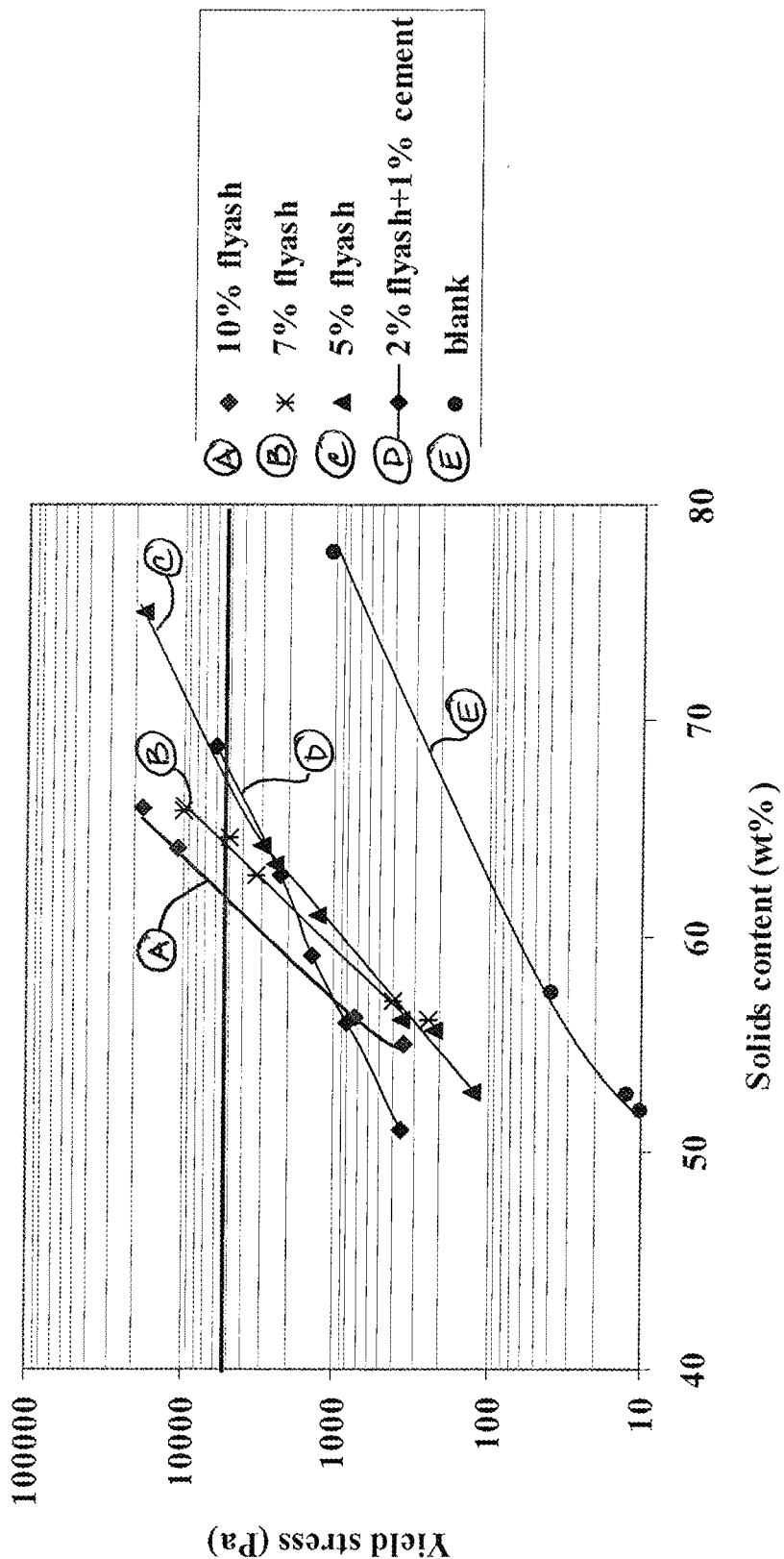
FIG. 14 is a graphical representation of the yield stress relative to solids content of thickened tailings, having a 50 wt % solids content, treated with various amounts of fly ash or cement or mixtures thereof and deposited in an open lid container.
Figure 15:
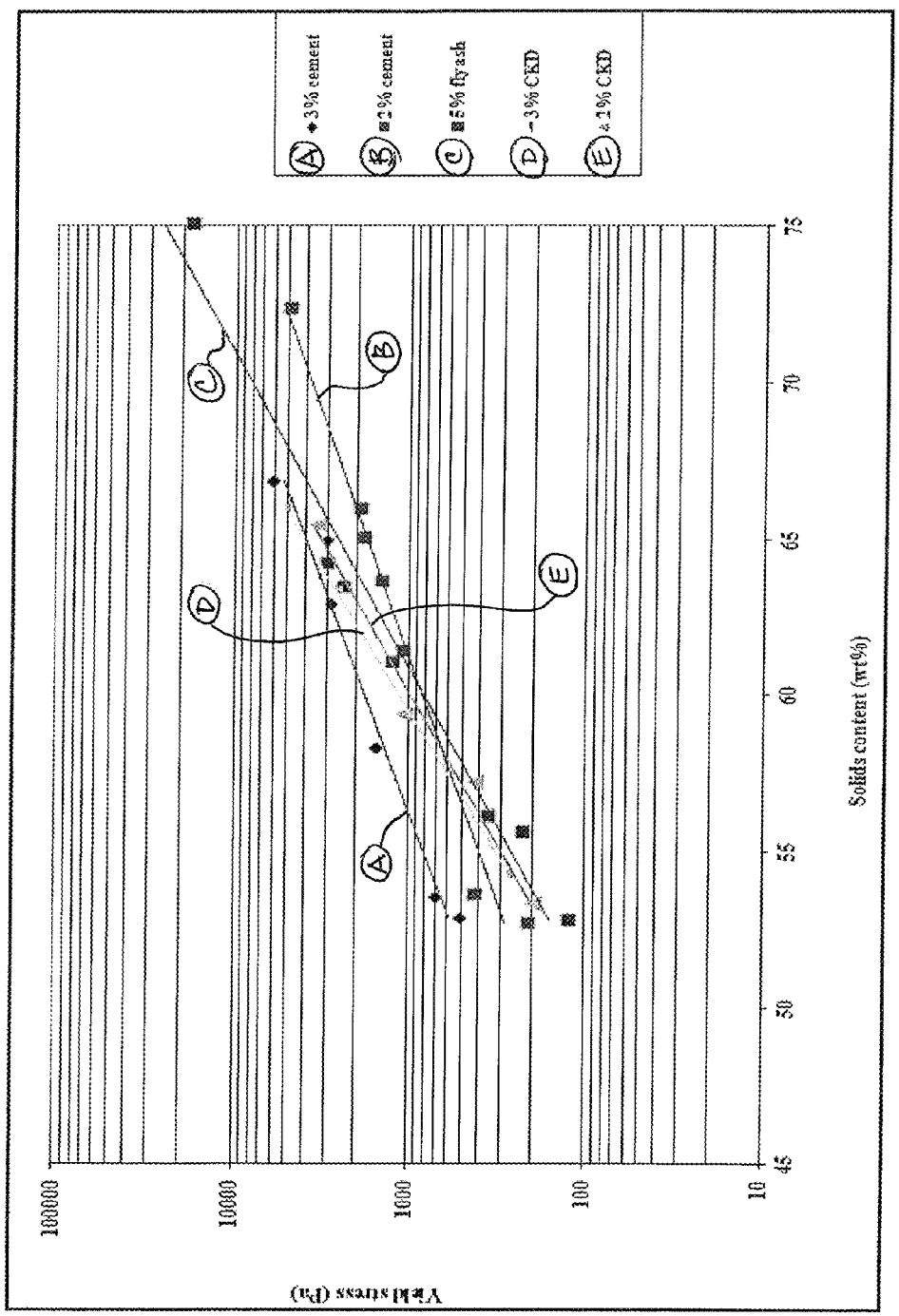
FIG. 15 is a graphical representation of the yield stress relative to solids content of thickened tailings, having 50 wt % solids content, treated with various amounts of fly ash, cement or cement kiln dust (CKD) and deposited in an open lid container.
Figure 16:
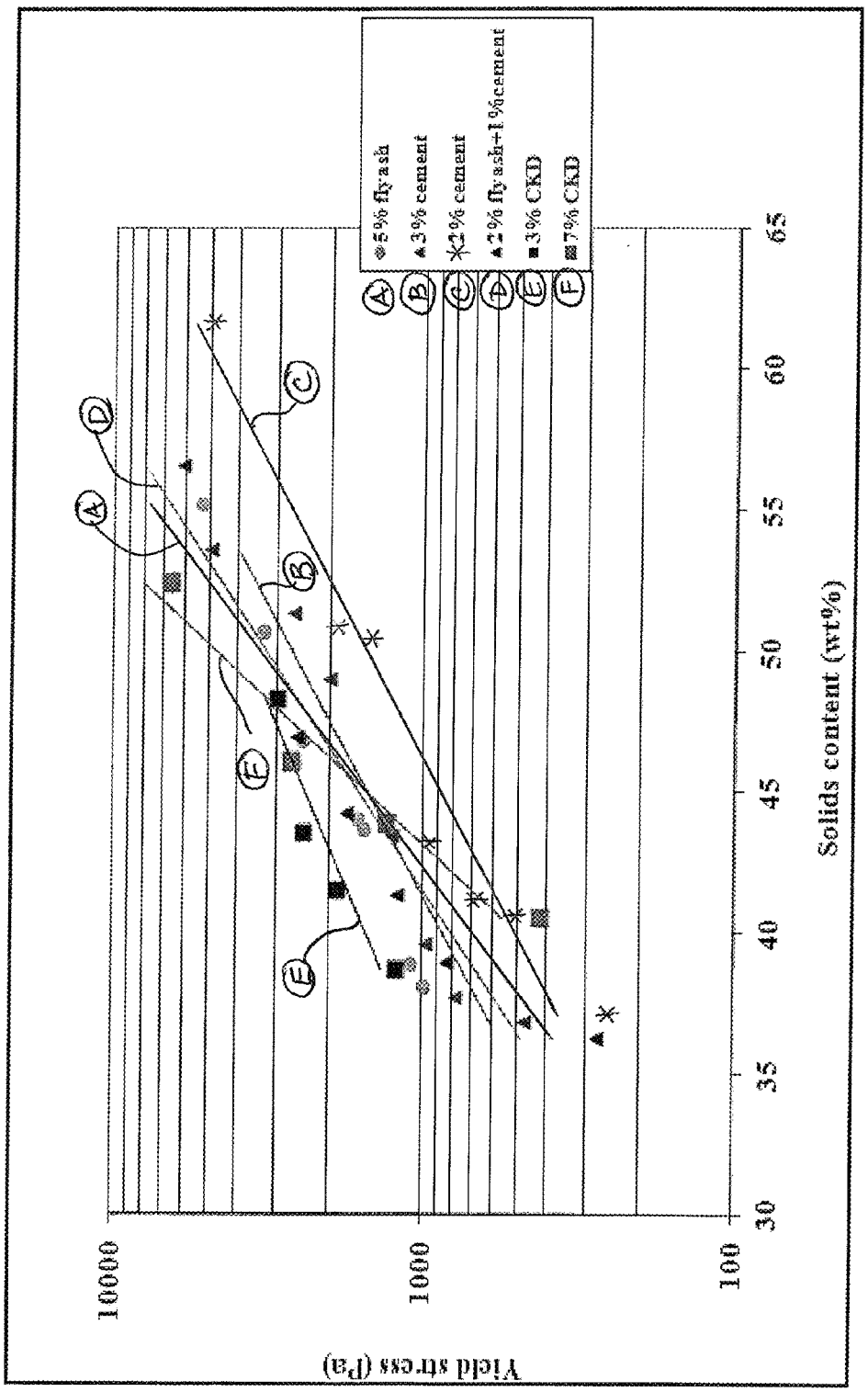
FIG. 16 a graphical representation of the yield stress relative to solids content of mature fine tailings treated with various amounts of fly ash, cement or cement kiln dust (CKD) or mixtures of fly ash and cement and deposited in an open lid container.
Figure 17:
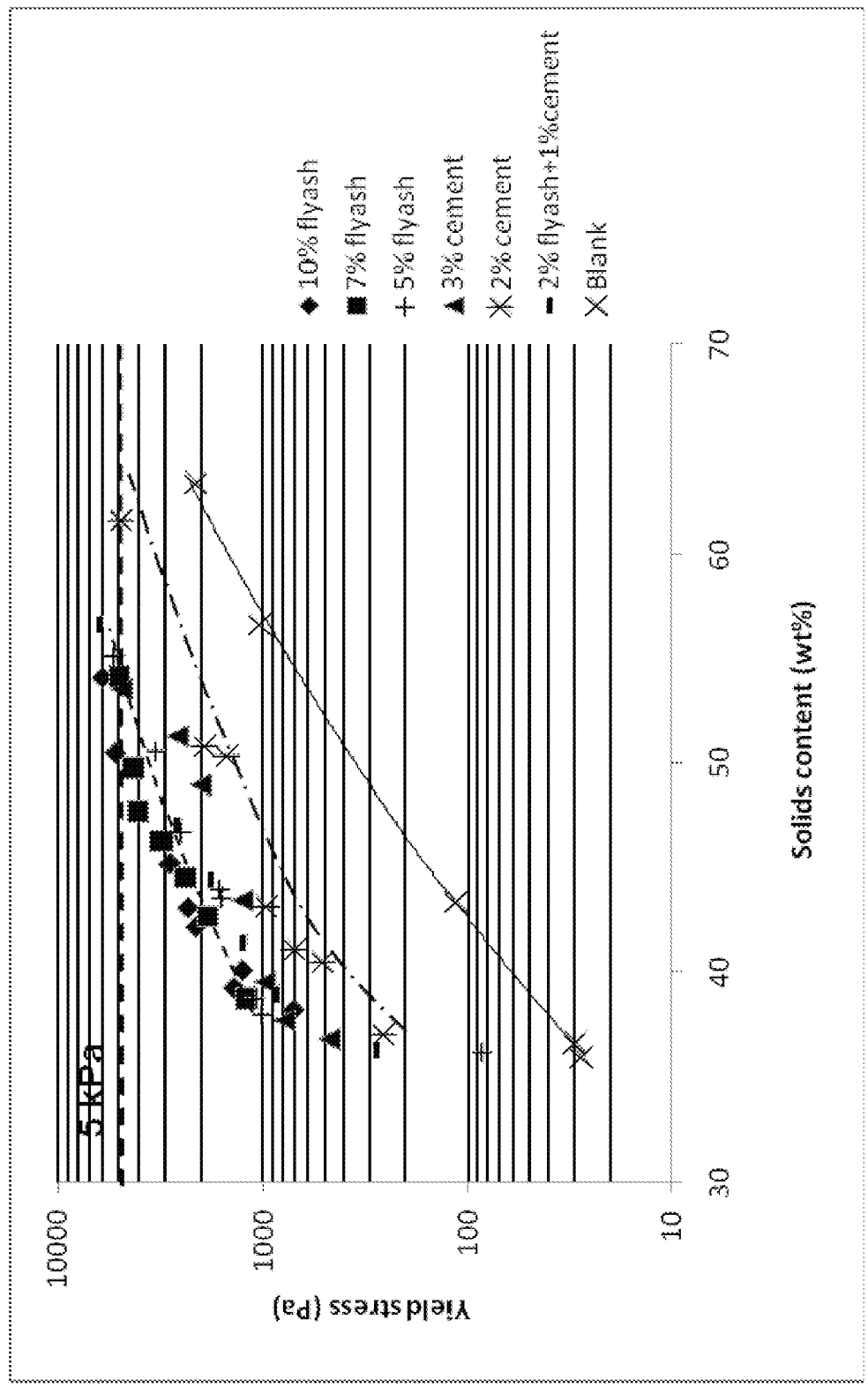
FIG. 17 a graphical representation of the yield stress relative to solids content of mature fine tailings treated with various amounts of fly ash, cement or mixtures thereof and deposited in an open lid container.

Having reference to FIG. 13, greater values for Capillary Suction Testing (CST) are indicative that the material is less likely to lose water.

Further Testing

Yield Strength Tests—Geopolymer Dosing at 2 wt % to 10 wt %

Having reference to FIGS. 14 to 17, further testing of a variety of geopolymersG and dosing amounts in the range of about 2 wt % to about 10 wt % geopolymerG was performed using the MFT and TT samples as described for FIGS. 5 to 13.

The results of the initial testing were confirmed using the further testing as shown in FIGS. 14 to 17.

SRF and CST Testing

Testing was performed using two, conventional tests, specific resistance to filtering (SRF) and capillary suction testing (CST), for determining the dewaterability of the deposit, according to embodiments described herein.

As shown in Table B below, both CST and SFR tests were performed for selected TT and MFT samples treated with either flyash or cement. The greater the value is for CST and for SFR, the poorer the dewaterability of the treated deposit.

TABLE B

| Geopolymer | MFT | TT having different solids content (wt %) | | | |
| --- | --- | --- | --- | --- | --- |
| | | 50 | 45 | 40 | 35 |
| Blank | 2200 | 1180 | 972 | 825 | 685 |
| 10 wt % fly ash | 1155 | 278 | 214 | 147 | 118 |
| 7 wt % fly ash | 1418 | 236 | 180 | 163 | 130 |
| 5 wt % fly ash | 1628 | 235 | 207 | — | — |
| 3 wt % cement | 1162 | 395 | 322 | 235 | 199 |

TABLE B-continued

| Geopolymer | MFT | TT having different solids content (wt %) | | | |
| --- | --- | --- | --- | --- | --- |
| | | 50 | 45 | 40 | 35 |
| 2 wt % cement | 1700 | 665 | 391 | — | — |
| 1 wt % cement | — | 1090 | — | — | — |

Untreated MST has a much higher CST than untreated TT indicating that untreated MFT has poorer dewaterability than the untreated TT.

Treatment of TT with geopolymer G resulted in a significant decrease in CST illustrating improved dewaterability. While the CST for the MST decreased, the decrease was not to the same extent as the treated TT due to the high percentage of fines in the MST.

Slump Testing

Figure 18:
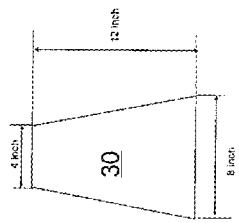
FIG. 18 is a side view of a cone used for slump testing of geopolymer-treated tailings streams.

Slump testing, conventional in the mining industry, was performed to confirm the strength of TT and MFT treated with fly ash. Geopolymer-treated fluid fine tailings GT was filled and packed into a test cone 30, such as shown in FIG. 18. The material was leveled with the top rim of the cone 30 and the cone 30 was lifted, leaving the treated material unsupported. The slump was the distance that the center of the cone top settled. The greater the slump observed, the weaker the materials.

TABLE C

| Sample | Yield stress before slump test (Pa) | Yield stress after slump test (Pa) | Slump (inches) | Calculated yield stress based on Slump (Pa) |
| --- | --- | --- | --- | --- |
| TT 50 wt % solid with 7 wt % fly ash after 1 hour | | 170 | 8.5 | 140 |
| TT 50 wt % solid with 7 wt % fly ash after 4 days | 1000 | 450 | 5 | 360 |
| MFT with with 7 wt % fly ash after 1 hour | | 400 | 5.5 | 300 |
| MFT with 7 wt % fly ash after 4 days | 480 | 310 | 6* | 250 |

*treated MFT was subjected to an unsuccessful slump test at two days and was reused for the 4 days test A notable increase in strength of the treated materials was noted for the TT between the 1 hour and the 4 day tests.

Applicant believes that the manipulation of the treated MFT at two days may have resulted in the lower strength (greater slump) at 4 days.

Figure 20:
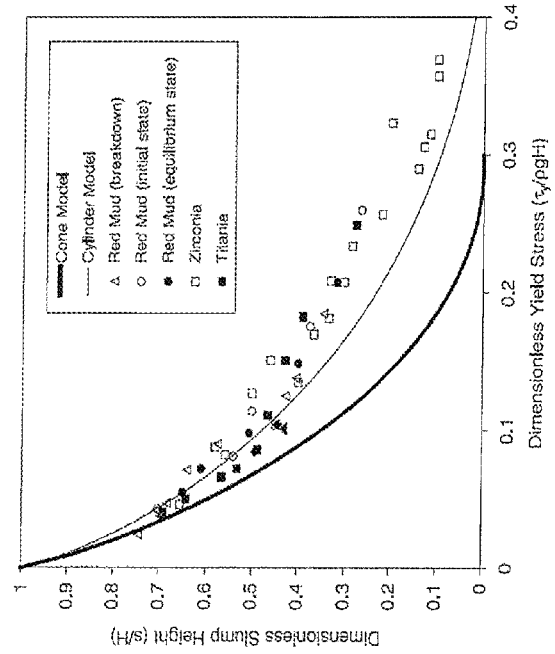
FIG. 20 is a graphical representation of the relationship between dimensionless slump height and dimensionless yield stress for conventional tailings.
Figure 19:
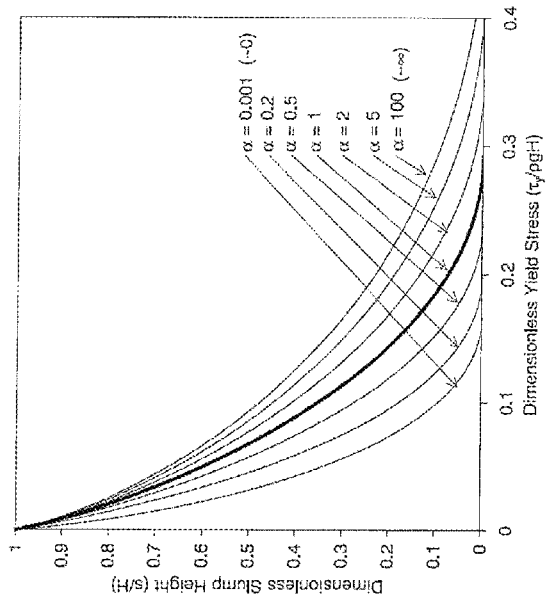
FIG. 19 is a graphical representation of the relationship between dimensionless slump height and dimensionless yield stress for geopolymer-treated tailings.

Results calculated from the slump tests were compared to yield stress measured using a conventional vane test. The calculated yield strengths shown in Table C above and graphed in FIG. 19, were estimated based upon slump test data using models known in the art and shown in FIG. 20.

Yield Strength Tests—Lower Limit

Having reference to FIGS. 21-25, geopolymer G was added to MFT samples having a solids content of about 34.5%, as described for the initial testing. With the exception of the tests shown in FIG. 23, the yield strength testing was performed using an open lid to simulate natural drying conditions.

Figure 21:
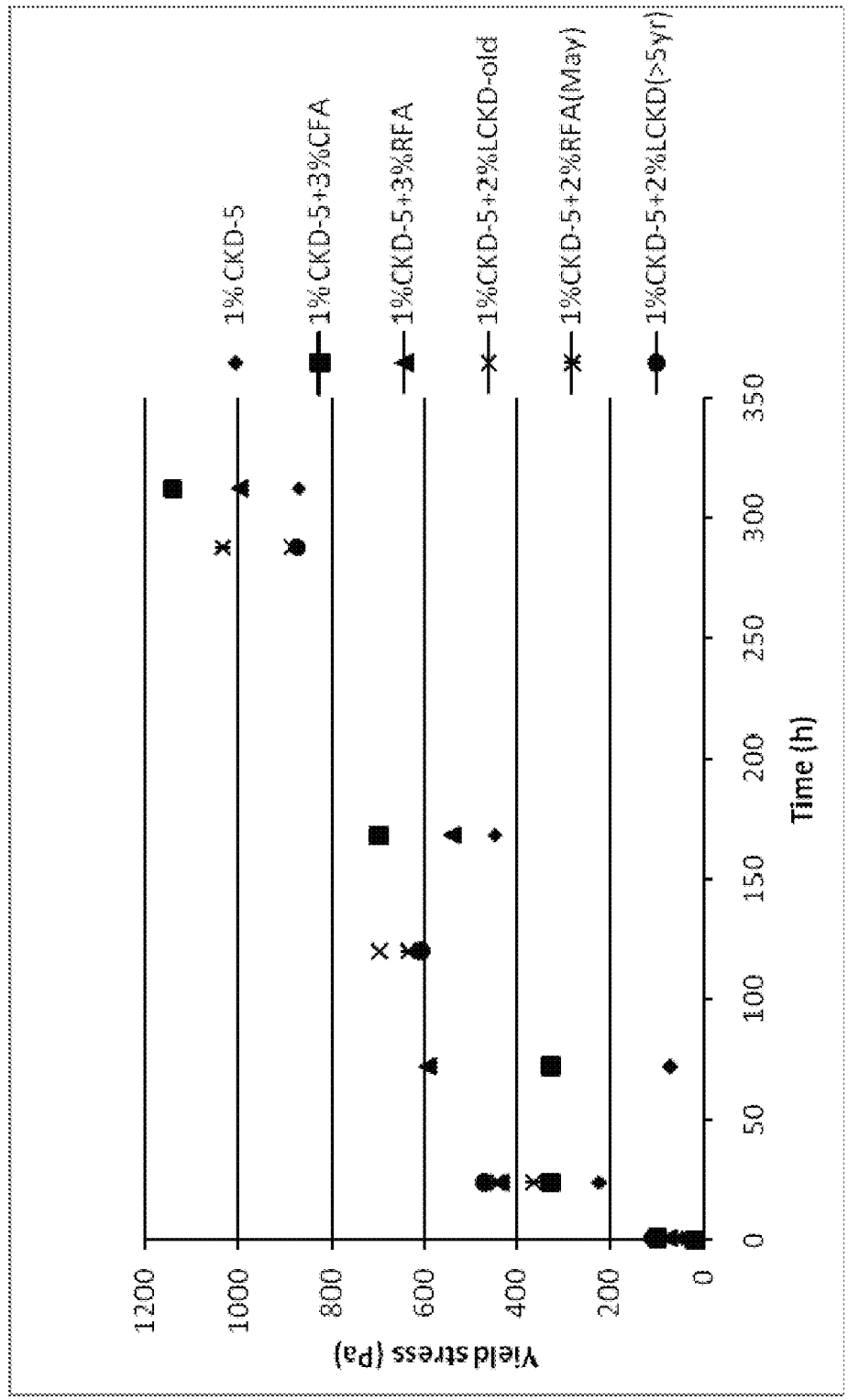
FIG. 21 is a graphical representation of the yield stress relative to time of mature fine tailings treated with various amounts of CKD-5 alone or mixed with non-self-activating geopolymers, in an open lid container.
Figure 22:
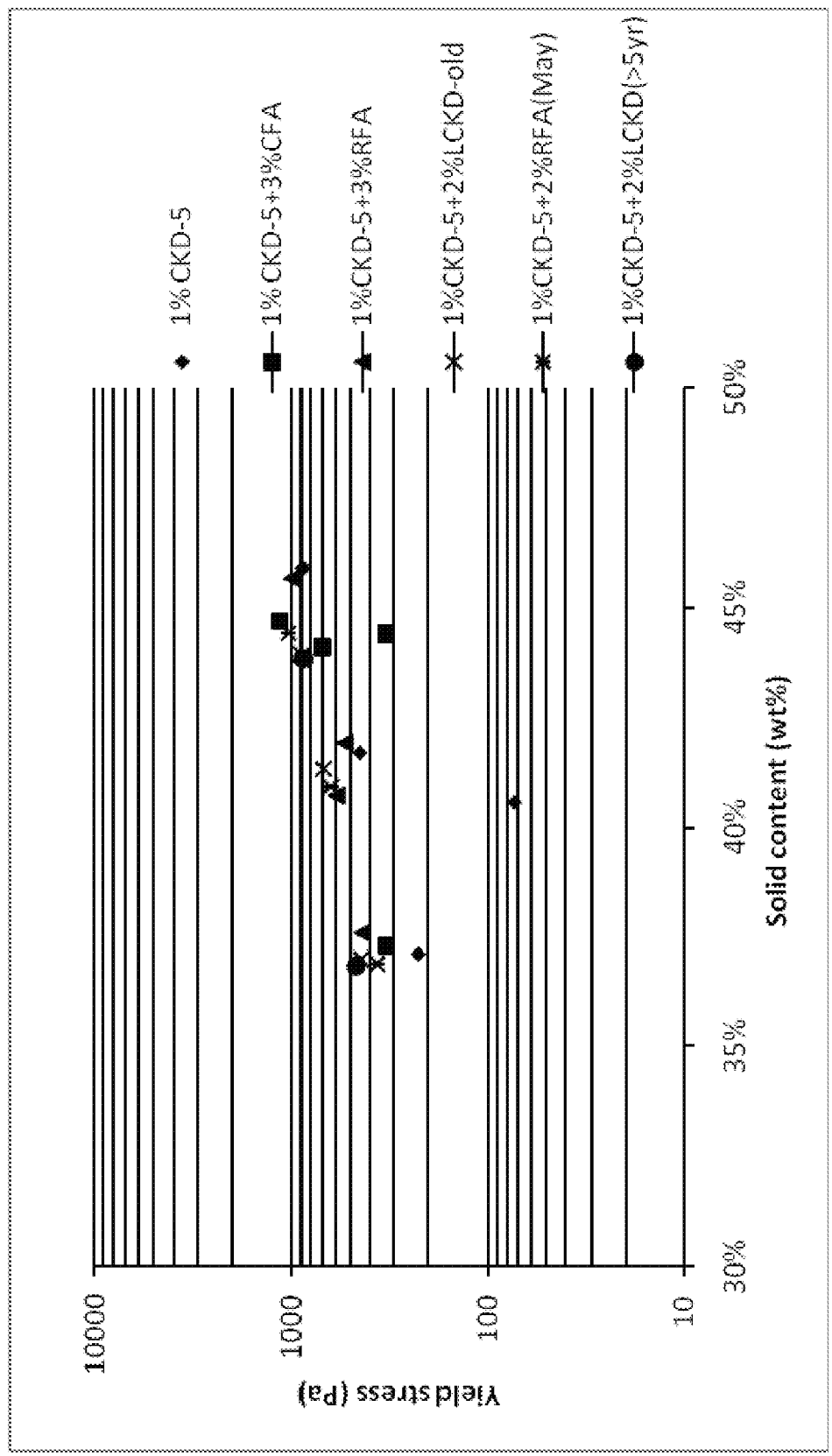
FIG. 22 is a graphical representation of the yield stress relative to solids content of mature fine tailings treated with various amounts of CKD-5 alone or mixed with non-self-activating geopolymers, in an open lid container.
Figure 23:
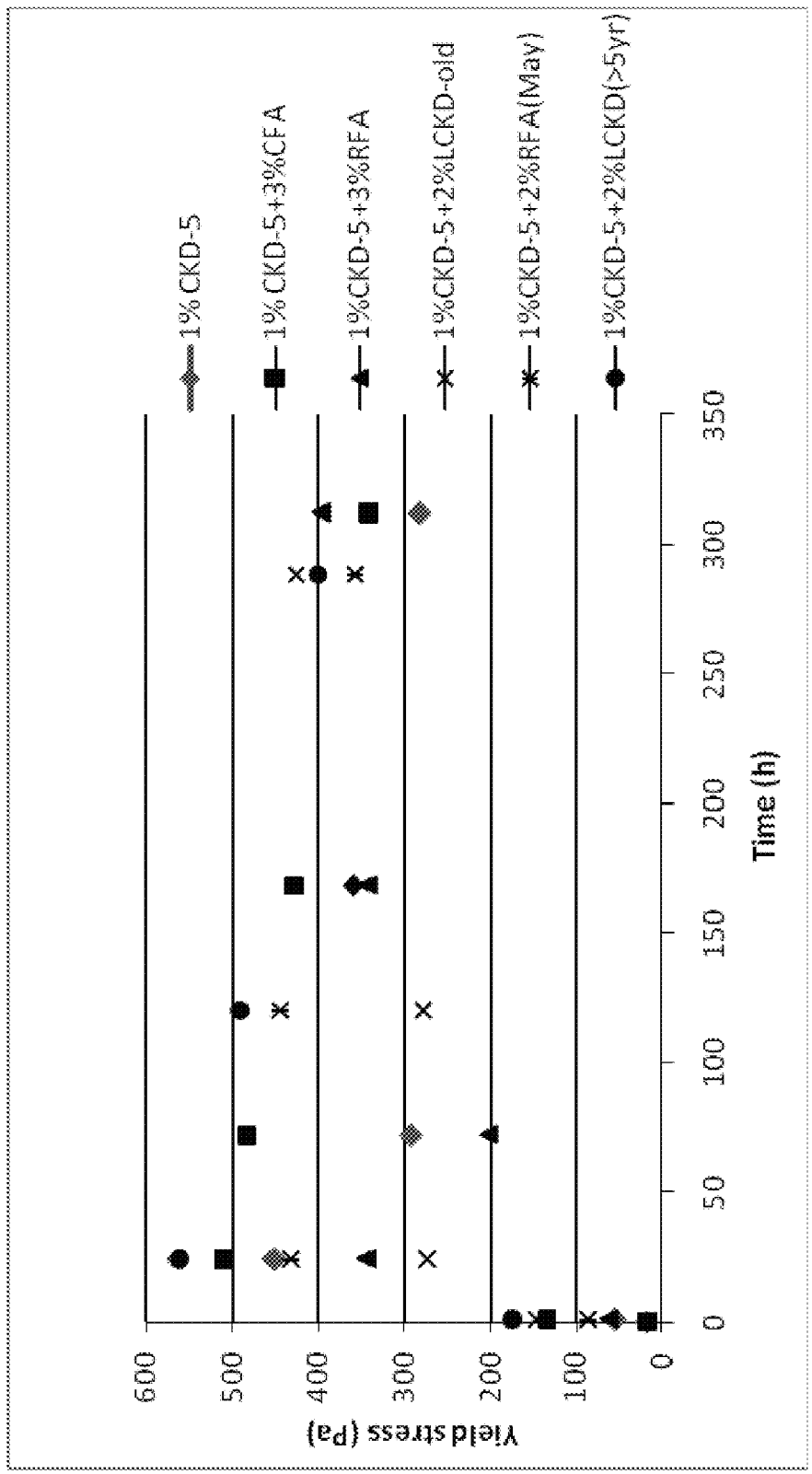
FIG. 23 is a graphical representation of the yield stress relative to time of mature fine tailings treated with various amounts of CKD-5 alone, or mixed with non-self-activating geopolymers, in a closed lid container.

As shown in FIGS. 21 to 23, the MFT samples were dosed with 1 wt % CKD-5, which is a self-activating cement kiln dust. Further, samples of the MFT were dosed with combinations of the self-activating CKD-5 at 1 wt % and a variety of non-self-activating geopolymers G, including 3 wt % classified fly ash (CFA), 3 wt % raw fly ash (RFA), 2 wt % LCKD-old, 2 wt % RFA and 2 wt % LCKD (>5 yr).

As can be seen in FIG. 21, the yield strength increases over time following the treatment of the MFT samples with the variety of geopolymers G. The CKD-5 acts as an activator A for the non-self-activating geopolymers G.

As shown in FIG. 22, the target 5 kPa is not reached for MFT until after the deposit has dewatered and dried to a solids content of greater than 46 wt %. Extrapolation of the lines in FIG. 22, confirms the initial testing that deposits of MFT treated with geopolymer G reach the target 5 kPa when the solids content reaches about 50-55 wt % for MFT.

With reference to FIG. 23, wherein the testing with MFT was done with a closed lid, the yield strength does not increase without evaporation of water. Thus, it appears for MFT that natural drying of the deposits may be required to achieve the target 5 kPa.

Figure 24:
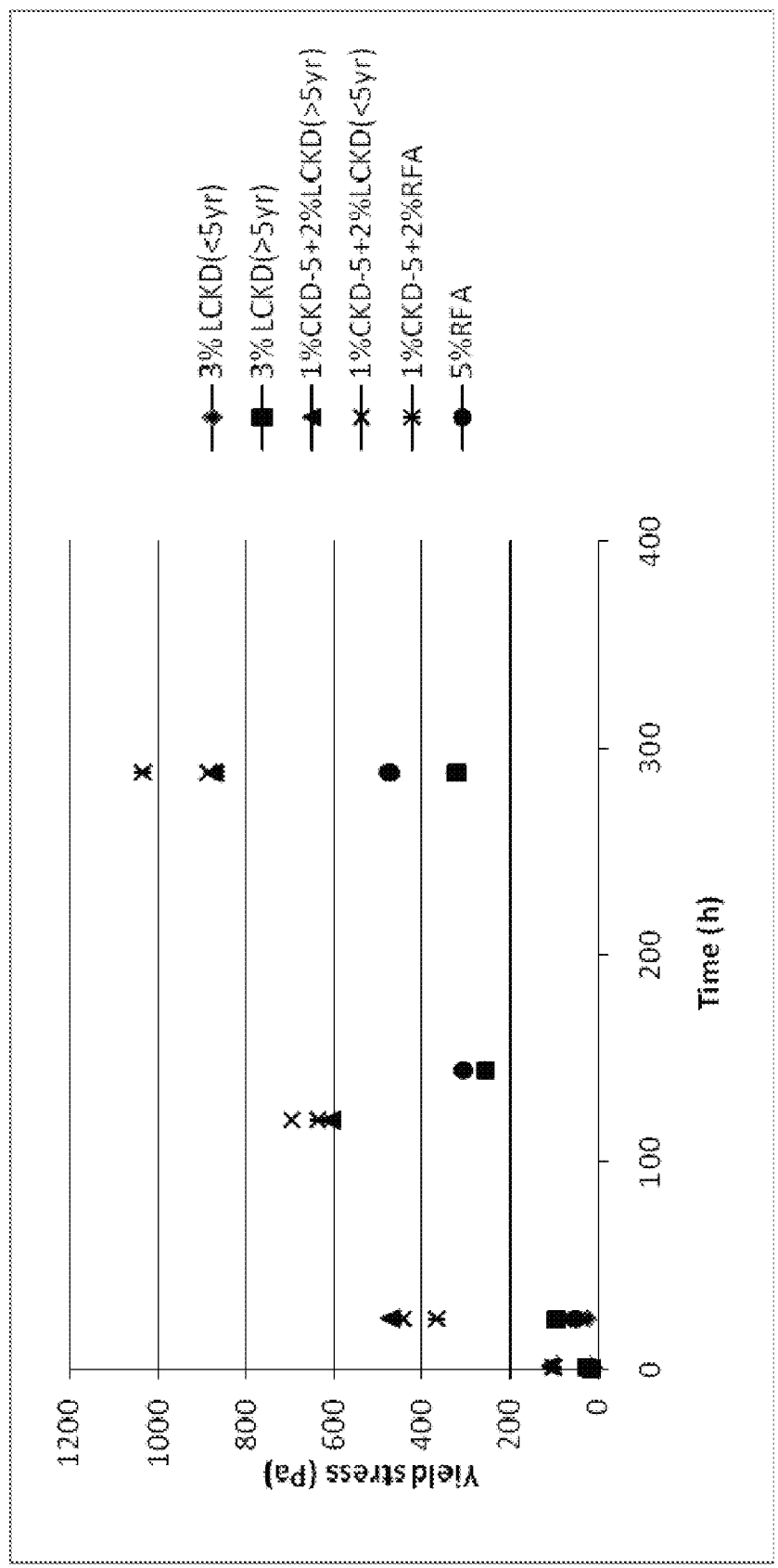
FIG. 24 is a graphical representation of the yield stress relative to time of mature fine tailings treated with various amounts of non-self-activating geopolymers alone or when activated using CKD-5, in an open lid container.
Figure 25:
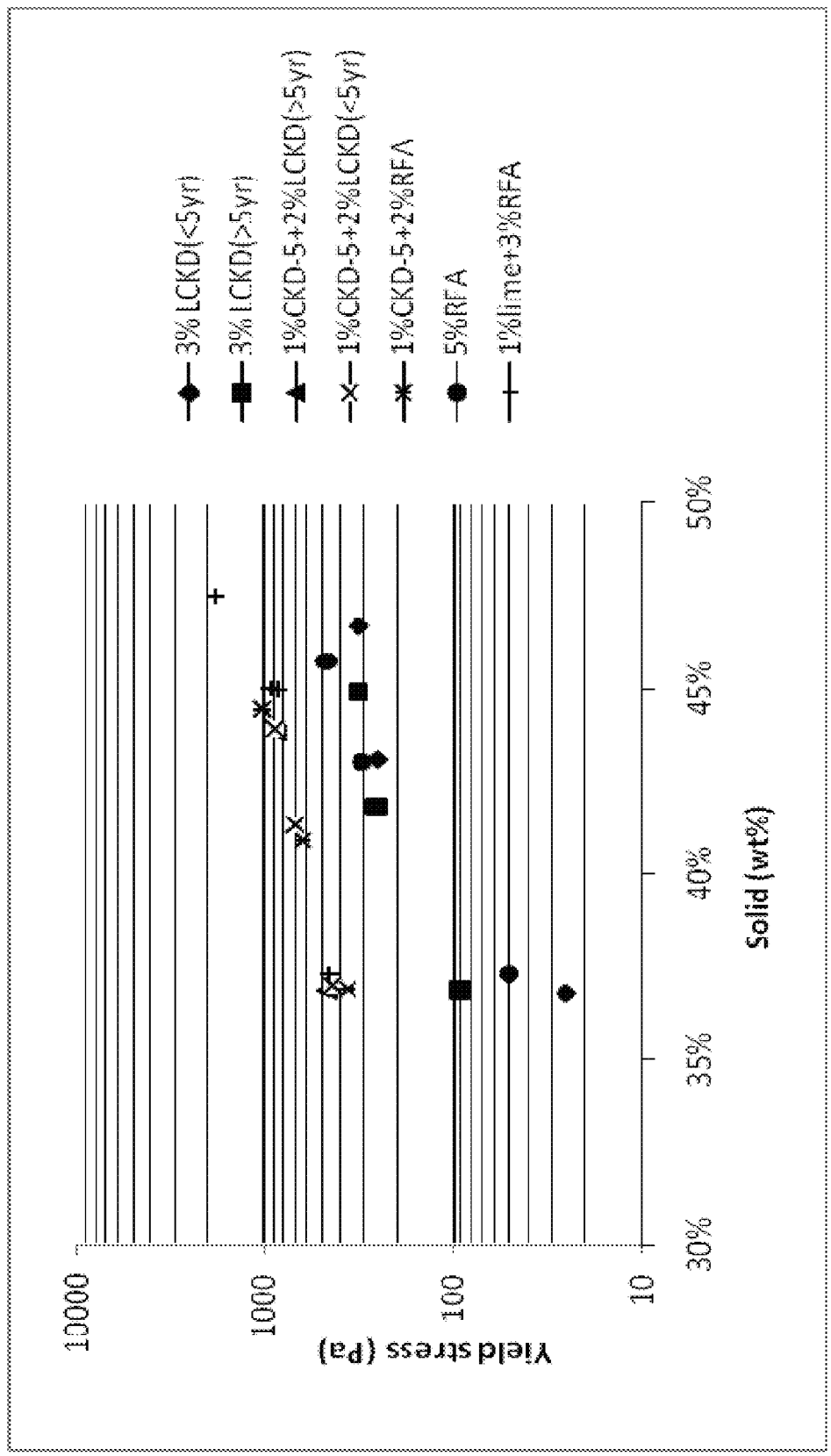
FIG. 25 is a graphical representation of the yield stress relaticve to solids content of mature fine tailings treated with various amounts of non-self-activating geopolymers alone or when activated using CKD-5 or lime, in an open lid container.

Having reference to FIGS. 24 and 25, MFT were dosed with non-self-activating geopolymers alone or in combination with either self-activating geopolymers or with another suitable activator, such as lime.

As shown in FIG. 24, non-self-activating geopolymers G, being 5 wt % RFA, 3 wt % LCKD (<5 yr) and 3 wt % LCKD (>5 yr), demonstrate relatively small gains in yield strength over time when compared to the combinations including a self-activating geopolymer, being 1 wt % CKD-5.

As shown in FIG. 25, non-self-activating geopolymers G, being 5 wt % RFA, 3 wt % LCKD (<5 yr) and 3 wt % LCKD (>5 yr), demonstrate relatively small gains in yield strength over time when compared to the combinations including a self-activating geopolymer G, being 1 wt % CKD-5 or lime.

Extrapolation of Lower Limit

Applicant believes, based largely upon the yield strength testing for MFT and TT and specifically for the yield strength testing using MFT at the lower ranges of about 1 wt % to about 3 wt % that the lower limit for the addition of the geopolymer can be extrapolated to be about 0.2 wt % to about 3 wt % of the dry solid content of the fluid fine tailings stream, regardless whether it is MFT or TT.

The embodiments in which an exclusive property or privilege is claimed are defined as follows:

1. A method for forming an oil sand fine tailings deposit having a minimum undrained shear strength of 5 kilopascals at about one year following depositing, the method comprising:
   flowing a stream of fluid fine tailings having a solid content of about 25 wt % to about 55 wt %;
   adding and mixing an effective amount of a dry geopolymer to the stream of fluid fine tailings for forming a geopolymer-treated tailings stream; comprising geopolymer from about 0.2 wt % to about 3 wt % of the dry solids content of the fluid fine tailings stream;
   adding an effective amount of one or more rheology modifiers to the stream of fluid fine tailings for temporarily postponing reaction between the geopolymer and the fluid fine tailings for enhancing dewatering of the fluid fine tailings until the solids content is about 60 wt % or greater;
   imparting shear to the geopolymer-treated tailings stream during the adding and mixing step; and
   depositing the geopolymer-treated tailings stream for forming the deposit, the deposit being exposed to ambient weather conditions,
   wherein the dry geopolymer is one or more of Class C flyash, activated Class F flyash, cement kiln dust (CKD), activated Landfill cement kiln dust (LCKD), activated colloidal silica, microwave incinerated rice husk ash and ground granulated blast furnace sludge.

2. The method of claim 1 further comprising:
   feeding the dry geopolymer from a hopper to the flowing stream of fluid fine tailings; and
   imparting the shear to the geopolymer-treated tailings stream using one or more in-line mixers.

3. The method of claim 1 further comprising:
   adjusting the pH of the fluid fine tailings stream before the addition of the geopolymer, after the addition of the geopolymer or both for controlling quality of water released from the deposit.

4. The method of claim 1 further comprising:
   depositing the geopolymer-treated tailings stream at a dedicated disposal area.

5. The method of claim 4 further comprising:
   depositing the geopolymer-treated tailings stream in a plurality of thin lifts or a plurality of thick lifts.

6. The method of claim 5 further comprising:
   depositing each of the lifts at a time interval of about one to about two weeks from a previously deposited lift.

7. The method of claim 5 further comprising:
   depositing the geopolymer-treated tailings stream at the dedicated disposal area in multi-layer thin lifts, each of the thin lifts of the multi-layer thin lifts being about 25 cm±10 cm and resulting in up to about 3.5 m±0.5 m total height per year.

8. The method of claim 5 further comprising:
   depositing the geopolymer-treated tailings stream at the dedicated disposal area in multi-layer thick lifts, each of the thick lifts of the multi-layer thin lifts being about 1 meter and resulting in up to about 4 m±1 m total height per year.

9. The method of claim 7 wherein being exposed to ambient weather conditions further comprises:
   exposing each of the thin lifts to natural drying.

10. The method of claim 8 wherein being exposed to ambient weather conditions further comprises:
    exposing each of the thick lifts to one or more freeze and thaw cycles.

11. The method of claim 1 wherein the activated geopolymer is not self-activating, prior to adding the geopolymer, the method further comprising:
    adding an effective amount of an activator to activate the geopolymer.

12. A system for practicing the method of claim 1 wherein the dry geopolymer is added to the flowing stream of fluid fine tailings, comprising:
    one or more high shear, in-line mixers for mixing the dry geopolymer material with the stream of fluid fine tailings and imparting the shear thereto.

13. A geopolymer-treated fluid fine tailings mixture, adapted for depositing and forming a deposit having a minimum undrained shear strength of 5 kilopascals one year following depositing, comprising:
    a stream of fluid fine tailings having a solid content of about 25 wt % to about 55 wt %; and
    an effective amount of a dry geopolymer comprising one or more of Class C flyash, activated Class F flyash, cement kiln dust (CKD), activated Landfill cement kiln dust (LCKD), activated colloidal silica, microwave incinerated rice husk ash and ground granulated blast furnace sludge; and
    a rheology modifier for temporarily postponing reaction between the geopolymer and the fluid fine tailings for enhancing dewatering of the fluid fine tailings until the solid content is about 60 wt % or greater,
    wherein an amount of the dry geopolymer added is from about 0.2 wt % to about 3 wt % of the dry solids content of the fluid fine tailings stream; and wherein shear is imparted to the mixture during addition of the geopolymer to the stream of fluid fine tailings.

14. The geopolymer-treated fine tailings mixture of claim 13 wherein the pH is adjusted prior to addition of geopolymer, after the addition of geopolymer or both, for controlling quality of water released from the mixture.

15. The geopolymer-treated fine tailings mixture of claim 13 wherein the dry geopolymer is not self-activating, the mixture further comprising:
an activator to activate the geopolymer.

16. A geopolymer-treated fluid fine tailings mixture, adapted for depositing and forming a deposit having a minimum undrained shear strength of 5 kilopascals one year following depositing, comprising:
a stream of fluid fine tailings having a solid content of about 25 wt % to about 55 wt %;
a dry geopolymer comprising one or more of Class C flyash, activated Class F flyash, cement kiln dust (CKD), activated Landfill cement kiln dust (LCKD), activated colloidal silica, microwave incinerated rice husk ash, ground granulated blast furnace sludge; and
a rheology modifier for temporarily postponing reaction between the geopolymer and the fluid fine tailings for enhancing dewatering of the fluid fine tailings until the solid content is about 60 wt % or greater,
wherein the geopolymer is added in an amount greater than about 0.2 wt % of the dry solids content of the fluid fine tailings stream; and
wherein shear is imparted to the mixture during addition of the geopolymer to the stream of fluid fine tailings.

17. The geopolymer-treated fine tailings mixture of claim 16 wherein the dry geopolymer is not self-activating, the mixture further comprising:
an activator to activate the geopolymer.

* * * * *